(12) United States Patent
Jain et al.

(10) Patent No.: US 8,296,316 B2
(45) Date of Patent: Oct. 23, 2012

(54) DYNAMICALLY SHARING A SUBTREE OF OPERATORS IN A DATA STREAM MANAGEMENT SYSTEM OPERATING ON EXISTING QUERIES

(75) Inventors: Namit Jain, Santa Clara, CA (US); Anand Srinivasan, Karnataka (IN); Shailendra Kumar Mishra, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 81 days.

(21) Appl. No.: 11/874,197

(22) Filed: Oct. 17, 2007

(65) Prior Publication Data

US 2009/0106189 A1    Apr. 23, 2009

(51) Int. Cl.
G06F 7/00    (2006.01)

(52) U.S. Cl. ........ 707/769; 707/713; 707/723; 707/737; 707/756

(58) Field of Classification Search .................. None
See application file for complete search history.

(56) References Cited

U.S. PATENT DOCUMENTS

| | | | |
|---|---|---|---|
| 4,996,687 A * | 2/1991 | Hess et al. ............... 714/15 |
| 5,495,600 A | 2/1996 | Terry et al. |
| 5,706,494 A | 1/1998 | Cochrane et al. |
| 5,822,750 A | 10/1998 | Jou et al. |
| 5,826,077 A | 10/1998 | Blakeley et al. |
| 5,857,182 A | 1/1999 | DeMichiel et al. |
| 5,937,401 A | 8/1999 | Hillegas |
| 6,081,801 A | 6/2000 | Cochrane et al. |
| 6,263,332 B1 | 7/2001 | Nasr et al. |
| 6,282,537 B1 | 8/2001 | Madnick et al. |
| 6,370,537 B1 | 4/2002 | Gilbert et al. |
| 6,438,540 B2 | 8/2002 | Nasr et al. |
| 6,449,620 B1 | 9/2002 | Draper et al. |
| 6,453,314 B1 | 9/2002 | Chan et al. |
| 6,507,834 B1 | 1/2003 | Kabra et al. |
| 6,546,381 B1 | 4/2003 | Subramanian et al. |
| 6,985,904 B1 | 1/2006 | Kaluskar et al. |
| 7,310,638 B1 | 12/2007 | Blair |
| 7,376,656 B2 | 5/2008 | Blakeley et al. |

(Continued)

OTHER PUBLICATIONS

Sharaf, M. A. et al "Efficient Scheduling of Heterogeneous Continuous Queries", Sep. 12-15, 2006, VLDB Endowment '06, pp. 511-522.*
Arvind Arasu, CQL: A Language for Continuous Queries over Streams and Relations, 2004, Lecture Notes in Computer Science, vol. 2921/2004, pp. 1-19.*
Shivnath Babu, The CQL continuous query language: semantic foundations and query execution, Jun. 2006, The VLDB Journal, vol. 15 Issue 2, pp. 121-142.*

(Continued)

Primary Examiner — Pierre Vital
Assistant Examiner — Mohammad S Rostami
(74) Attorney, Agent, or Firm — Silicon Valley Patent Group LLP; Omkar Suryadevara

(57) ABSTRACT

A new continuous query to a data stream management system (DSMS) may use several operators that are equivalent to operators currently being used by continuous queries that have been previously registered in the DSMS. To determine equivalence of operators, the DSMS checks at least the function and the data input to the operators. On finding equivalence, the DSMS modifies a global plan being executed, to use at least an existing subtree of operators during execution of the new continuous query, to generate a modified plan. The DSMS is also programmed to cause each relation source operator (which outputs a relation) to propagate a current state of the relation to each operator newly coupled to the relational operator. After propagation of current state to newly-coupled operators, each operator in the modified plan processes any new data and supplies the result to all operators coupled thereto, including newly-coupled operators and existing operators.

17 Claims, 8 Drawing Sheets

U.S. PATENT DOCUMENTS

| | | | |
|---|---|---|---|
| 7,383,253 | B1 | 6/2008 | Tsimelzon et al. |
| 7,403,959 | B2 | 7/2008 | Nishizawa et al. |
| 7,430,549 | B2 | 9/2008 | Zane et al. |
| 7,673,065 | B2 * | 3/2010 | Srinivasan et al. ............ 709/231 |
| 7,953,728 | B2 | 5/2011 | Hu et al. |
| 8,073,826 | B2 | 12/2011 | Srinivasan et al. |
| 2003/0065659 | A1 | 4/2003 | Agarwal et al. |
| 2004/0064466 | A1 | 4/2004 | Manikutty et al. |
| 2004/0220912 | A1 | 11/2004 | Manikutty et al. |
| 2004/0220927 | A1 | 11/2004 | Murthy et al. |
| 2004/0267760 | A1 | 12/2004 | Brundage et al. |
| 2005/0055338 | A1 | 3/2005 | Warner et al. |
| 2005/0065949 | A1 | 3/2005 | Warner et al. |
| 2005/0096124 | A1 | 5/2005 | Stronach |
| 2005/0097128 | A1 | 5/2005 | Ryan et al. |
| 2005/0177579 | A1 | 8/2005 | Blakeley et al. |
| 2005/0229158 | A1 | 10/2005 | Thusoo et al. |
| 2005/0289125 | A1 | 12/2005 | Liu et al. |
| 2006/0100969 | A1 | 5/2006 | Wang et al. |
| 2006/0224576 | A1 | 10/2006 | Liu et al. |
| 2006/0230029 | A1 | 10/2006 | Yan |
| 2006/0235840 | A1 | 10/2006 | Manikutty et al. |
| 2007/0022092 | A1 * | 1/2007 | Nishizawa et al. ............... 707/2 |
| 2007/0136254 | A1 | 6/2007 | Choi et al. |
| 2007/0226239 | A1 | 9/2007 | Johnson et al. |
| 2007/0294217 | A1 | 12/2007 | Chen et al. |
| 2008/0010241 | A1 * | 1/2008 | McGoveran ...................... 707/2 |
| 2008/0028095 | A1 | 1/2008 | Lang et al. |
| 2008/0046401 | A1 | 2/2008 | Lee et al. |
| 2008/0082514 | A1 | 4/2008 | Khorlin et al. |
| 2008/0114787 | A1 | 5/2008 | Kashiyama et al. |
| 2008/0301124 | A1 * | 12/2008 | Alves et al. ........................ 707/5 |
| 2009/0043729 | A1 | 2/2009 | Liu et al. |
| 2009/0070786 | A1 | 3/2009 | Alves et al. |
| 2009/0106189 | A1 | 4/2009 | Jain et al. |
| 2009/0106190 | A1 | 4/2009 | Srinivasan et al. |
| 2009/0106198 | A1 | 4/2009 | Srinivasan et al. |
| 2009/0106214 | A1 | 4/2009 | Jain et al. |
| 2009/0106215 | A1 | 4/2009 | Jain et al. |
| 2009/0106440 | A1 | 4/2009 | Srinivasan et al. |
| 2009/0248749 | A1 | 10/2009 | Gu et al. |

OTHER PUBLICATIONS

Arasu, A. et al. "STREAM: The Stanford Data Stream Management System", Department of Computer Science, Stanford University, 2004, pp. 21.
Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.
Terry, D.B. et al. "Continuous queries over append-only databases", Proceedings of 1992 ACM SIGMOD, pp. 321-330.
Arasu, A. et al. "The CQL Continuous Query Language: Semantic Foundation and Query Execution", VLDB Journal, vol. 15, Issue 2, Jun. 2006, pp. 32.
Arasu, A. et al. "An Abstract Semantics and Concrete Language for Continuous Queries over Streams and Relations", $9^{th}$ International Workshop on Database programming languages, Sep. 2003, pp. 12.
Babu, S. et al. "Continuous Queries over Data Streams", SIGMOD Record, Sep. 2001, pp. 12.
Diao, Y. "Query Processing for Large-Scale XML Message Brokering", 2005, University of California Berkeley, pp. 226.
Diao, Y. et al. "Query Processing for High-Volume XML Message Brokering", Proceedings of the $29^{th}$ VLDB Conference, Berlin, Germany, 2003, pp. 12.
Lakshmanan, L.V.S. et al. "On efficient matching of streaming XML documents and queries", 2002, pp. 18.
Chan, C. et al. "Efficient filtering of XML documents with XPath expressions", VLDB Journal, 2002, pp. 354-379.
Jin, C. et al. "ARGUS: Efficient Scalable Continuous Query Optimization for Large-Volume Data Streams", $10^{th}$ International Database Engineering and Applications Symposium (IDEAS'06), 2006, pp. 7.
Buza, A. et al. "Extension of CQL over Dynamic Databases", Journal of Universal Computer Science, vol. 12, No. 9 (2006), pp. 1165-1176.

Entire Prosecution History of U.S. Appl. No. 11/874,850 filed on Oct. 18, 2007 by Namit Jain et al.
Entire Prosecution History of U.S. Appl. No. 11/874,896 filed on Oct. 18, 2007 by Anand Srinivasan et al.
Entire Prosecution History of U.S. Appl. No. 11/977,439 filed on Oct. 20, 2007 by Anand Srinivasan et al.
Entire Prosecution History of U.S. Appl. No. 11/977,437 filed on Oct. 20, 2007 by Anand Srinivasan et al.
Entire Prosecution History of U.S. Appl. No. 11/977,440 filed on Oct. 20, 2007 by Anand Srinivasan et al.
Entire Prosecution History of U.S. Appl. No. 11/873,407 filed on Oct. 16, 2007 by Namit Jain et al.
Entire Prosecution History of U.S. Appl. No. 11/874,202 filed on Oct. 17, 2007 by Namit Jain et al.
Office Action dated Dec. 3, 2009 in U.S. Appl. No. 11/874,202; 14 pages.
Amendment dated Apr. 8, 2010 in U.S. Appl. No. 11/874,202; 9 pages.
Final Office Action dated Jun. 8, 2010 in U.S. Appl. No. 11/874,202; 17 pages.
Amendment dated Sep. 8, 2010 in U.S. Appl. No. 11/874,202; 10 pages.
Examiner Interview Summary dated Sep. 14, 2010 in U.S. Appl. No. 11/874,202; 3 pages.
Preliminary Amendment dated Oct. 15, 2009 in U.S. Appl. No. 11/874,850; 7 pages.
Notice of Allowance dated Nov. 24, 2009 in U.S. Appl. No. 11/874,850; 12 pages.
Supplemental Notice of Allowance dated Dec. 11, 2009 in U.S. Appl. No. 11/874,850; 2 pages.
Supplemental Notice of Allowance dated Jan. 27, 2010 in U.S. Appl. No. 11/874,850; 10 pages.
Amendment after Notice of Allowance dated Feb. 24, 2010 in U.S. Appl. No. 11/874,850; 4 pages.
Examiner Interview Summary dated Nov. 18, 2009 in U.S. Appl. No. 11/874,850; 3 pages.
Preliminary Amendment dated Oct. 16, 2009 in U.S. Appl. No. 11/874,896; 7 pages.
Office Action dated Dec. 8, 2009 in U.S. Appl. No. 11/874,896; 15 pages.
Amendment dated Apr. 8, 2010 in U.S. Appl. No. 11/874,896; 13 pages.
Final Office Action dated Jul. 23, 2010 in U.S. Appl. No. 11/874,896; 25 pages.
Amendment dated Oct. 25, 2010 in U.S. Appl. No. 11/874,896; 18 pages.
Office Action dated Nov. 22, 2010 in U.S. Appl. No. 11/874,896; 25 pages.
Examiner Interview Summary dated Oct. 25, 2010 in U.S. Appl. No. 11/874,896; 3 pages.
Preliminary Amendment dated Oct. 15, 2009 in U.S. Appl. No. 11/977,439; 10 pages.
Office Action dated Apr. 13, 2010 in U.S. Appl. No. 11/977,439; 7 pages.
Amendment dated Jul. 13, 2010 in U.S. Appl. No. 11/977,439; 10 pages.
Terminal Disclaimer dated Jul. 13, 2010 filed in U.S. Appl. No. 11/977,439 over U.S. Appl. No. 11/874,896; 2 pages.
Terminal Disclaimer dated Jul. 13, 2010 filed in U.S. Appl. No. 11/977,439 over US Patent 7,673,065; 2 pages.
Terminal Disclaimer dated Jul. 13, 2010 filed in U.S. Appl. No. 11/977,439 over U.S. Appl. No. 11/977,437; 2 pages.
Notice of Allowance dated Aug. 18, 2010 in U.S. Appl. No. 11/977,439; 11 pages.
Notice of Allowance dated Nov. 24, 2010 in U.S. Appl. No. 11/977,439; 8 pages.
Office Action dated Oct. 13, 2009 in U.S. Appl. No. 11/977,437; 9 pages.
Amendment dated Jan. 13, 2010 in U.S. Appl. No. 11/977,437; 19 pages.
Final Office Action dated Apr. 8, 2010 in U.S. Appl. No. 11/977,437; 18 pages.

Amendment, dated Sep. 8, 2010 in U.S. Appl. No. 11/977,437; 12 pages.
Examiner Interview Summary, dated Aug. 17, 2010 in U.S. Appl. No. 11/977,437; 3 pages.
Notice of Allowance, dated Oct. 7, 2009 in U.S. Appl. No. 11/977,440; 6 pages.
Amendment after Notice of Allowance, dated Dec. 5, 2009 in U.S. Appl. No. 11/977,440; 10 pages.
Response to Amendment under Rule 312, dated Jan. 7, 2010 in U.S. Appl. No. 11/977,440; 2 pages.
Examiner Interview Summary dated Dec. 1, 2009 in U.S. Appl. No. 11/977,440; 3 pages.
Office Action dated Sep. 17, 2008 in U.S. Appl. No. 11/601,415; 10 pages.
Amendment dated Jan. 20, 2009 in U.S. Appl. No. 11/601,415; 39 pages.
Final Office Action dated May 27, 2009 in U.S. Appl. No. 11/601,415; 26 pages.
Amendment dated Jul. 27, 2009 in U.S. Appl. No. 11/601,415; 24 pages.
Advisory Action dated Aug. 18, 2009 in U.S. Appl. No. 11/601,415; 3 pages.
Amendment dated Aug. 27, 2009 in U.S. Appl. No. 11/601,415; 28 pages.
Office Action dated Nov. 30, 2009 in U.S. Appl. No. 11/601,415; 32 pages.
Amendment dated Mar. 29, 2010 in U.S. Appl. No. 11/601,415; 20 pages.
Final Office Action dated Jun. 30, 2010 in U.S. Appl. No. 11/601,415; 45 pages.
Examiner Interview Summary dated Oct. 12, 2010 in U.S. Appl. No. 11/601,415; 3 pages.
Amendment dated Nov. 1, 2010 in U.S. Appl. No. 11/601,415; 12 pages.
Preliminary Amendment dated Oct. 16, 2009 in U.S. Appl. No. 11/873,407; 5 pages.
Office Action dated Nov. 13, 2009 in U.S. Appl. No. 11/873,407; 7 pages.
Amendment dated Feb. 16, 2010 in U.S. Appl. No. 11/873,407; 14 pages.
Final Office Action dated Apr. 26, 2010 in U.S. Appl. No. 11/873,407; 11 pages.
Amendment dated Aug. 26, 2010 in U.S. Appl. No. 11/873,407; 10 pages.
Examiner Interview Summary dated Aug. 30, 2010 in U.S. Appl. No. 11/873,407; 3 pages.
Examiner Interview Summary dated Nov. 10, 2010 in U.S. Appl. No. 11/873,407; 2 pages.
Notice of Allowance dated Nov. 10, 2010 in U.S. Appl. No. 11/873,407; 14 pages.
Examiner's Interview Summary dated May 23, 2011 in U.S. Appl. No. 11/874,896, 3 pages.
Terminal Disclaimer dated May 23, 2011 in U.S. Appl. No. 11/874,896 over U.S. Appl. No. 11/874,202, 2 pages.
Terminal Disclaimer dated May 23, 2011 in U.S. Appl. No. 11/874,896 over U.S. Appl. No. 11/977,439, 2 pages.
Terminal Disclaimer dated May 23, 2011 in U.S. Appl. No. 11/874,896 over U.S. Appl. No. 11/977,437, 2 pages.
Terminal Disclaimer dated May 23, 2011 in U.S. Appl. No. 11/874,896 over US Patent 7,673,065, 2 pages.
Terminal Disclaimer dated May 23, 2011 in U.S. Appl. No. 11/874,896 over U.S. Appl. No. 11/874,197, 2 pages.
Applicant's Interview Summary dated May 23, 2011 in U.S. Appl. No. 11/874,896, 1 page.
Notice of Allowance dated Mar. 31, 2011 in U.S. Appl. No. 11/874,202, 12 pages.
Amendment dated Feb. 20, 2011 in U.S. Appl. No. 11/977,439, 9 pages.
Notice of Allowance dated Mar. 16, 2011 in U.S. Appl. No. 11/977,439, 10 pages.
Notice of Allowance dated Dec. 22, 2010 in U.S. Appl. No. 11/874,202, 13 pages.
Amendment dated Feb. 22, 2011 in U.S. Appl. No. 11/874,896, 19 pages.
Notice of Allowance dated Mar. 7, 2011 in U.S. Appl. No. 11/873,407, 8 pages.
Interview Summary dated Jun. 30, 2011 in U.S. Appl. No. 11/874,202, 1 page.
Notice of Allowance dated Jun. 23, 2011 in U.S. Appl. No. 11/874,896, 32 pages.
Terminal Disclaimer Review Decision dated Jun. 2, 2011 in U.S. Appl. No. 11/874,896, 2 pages.
Amendment after Notice of Allowance dated Sep. 23, 2011 in U.S. Appl. No. 11/874,896, 9 pages.
Response to Amendment dated Nov. 9, 2011 in U.S. Appl. No. 11/874,896, 2 pages.
Office Action dated Dec. 9, 2011 in U.S. Appl. No. 11/601,415, 55 pages.
U.S. Appl. No. 13/184,528, pp. 46.
Notice of Allowance dated Mar. 1, 2012 in U.S. Appl. No. 13/184,528, pp. 26.
Amendment dated Mar. 9, 2012 in U.S. Appl. No. 11/601,415, pp. 11.
Golab, L. "Sliding Window Query Processing over data streams", University of Waterloo, Canada, Aug. 2006.
Munagala, K. et al. "Optimization of Continuous Queries with Shared Expensive Filters", Proceedings of the 26th ACM SIGMOD-SIGACT-SIGART symposium on Principles of database systems, believed to be prior to Oct. 17, 2007, pp. 14.
Avnur, R. et al. "Eddies: Continuously Adaptive Query Processing", In Proceedings of the 2000 ACM SIGMOD International Conference on Management of Data, Dallas, TX, May 2000, pp. 12.
Avnur, R. et al. "Eddies: Continuously Adaptive Query Processing", slide show, believed to be prior to Oct. 17, 2007, pp. 4.
Madden, S. et al. "Continuously Adaptive Continuous Queries (CACQ) over Streams", SIGMOD, 2002, pp. 6.
Deshpande, A. et al. "Adaptive Query Processing", believed to be prior to Oct. 17, 2007, pp. 27.
Widom, J. et al. "CQL: A Language for Continuous Queries over Streams and Relations", believed to be prior to Oct. 17, 2007, pp. 31.
Motwani, R. et al. "Models and Issues in Data Stream Systems", Proceedings of the 21st ACM SIGMOD-SIGACT-SIGART symposium on Principles of database systems, 2002, pp. 26.
Widom, J. et al. "The Stanford Data Stream Management System", believed to be prior to Oct. 17, 2007, pp. 24.
Oracle Application Server 10 g Release 2 and 3, New Features Overview, An Oracle White Paper, Oct. 2005, pp. 48.
Oracle Database, SQL Language Reference, 11 g Release 1 (11.1), B28286-02, Sep. 2007, pp. 144.
Stream Query Repository: Online Auctions, http://www-db.stanford.edu/stream/sqr/onauc.html#queryspecsend , Dec. 2, 2002, pp. 2.
Stream Query Repository: Online Auctions (CQL Queries), http://www-db.stanford.edu/stream/sqr/cql/onauc.html , Dec. 2, 2002, pp. 3.
Bose, S. et al., "A Query Algebra for Fragmented XML Stream Data", 9th International Workshop on Data Base Programming Languages (DBPL), Sep. 2003, Postdam, Germany, http://lambda.uta.edu/dbp103.pdf, pp. 11.
Fernandez, Mary et al., "Build your own XQuery processor", http://edbtss04.dia.uniroma3.it/Simeon.pdf, pp. 116, 2004.
Fernandez, Mary et al., Implementing XQuery 1.0: The Galax Experience:, Proceedings of the 29th VLDB Conference, Berlin, Germany, 2003, pp. 4.
Florescu, Daniela et al., "The BEA/XQRL Streaming XQuery Processor", Proceedings of the 29th VLDB Conference, 2003, Berlin, Germany, pp. 12.
Gilani, A. Design and implementation of stream operators, query instantiator and stream buffer manager, Dec. 2003, pp. 138.

* cited by examiner

```
Q1: Select B, max(A)
    From    S1 [Rows 50,000]
    Group By B
```

```
Q2: Select Istream(*)
    From    S1 [Rows 40,000], S2 [Range 600 Seconds]
    Where   S1.A = S2.A
```

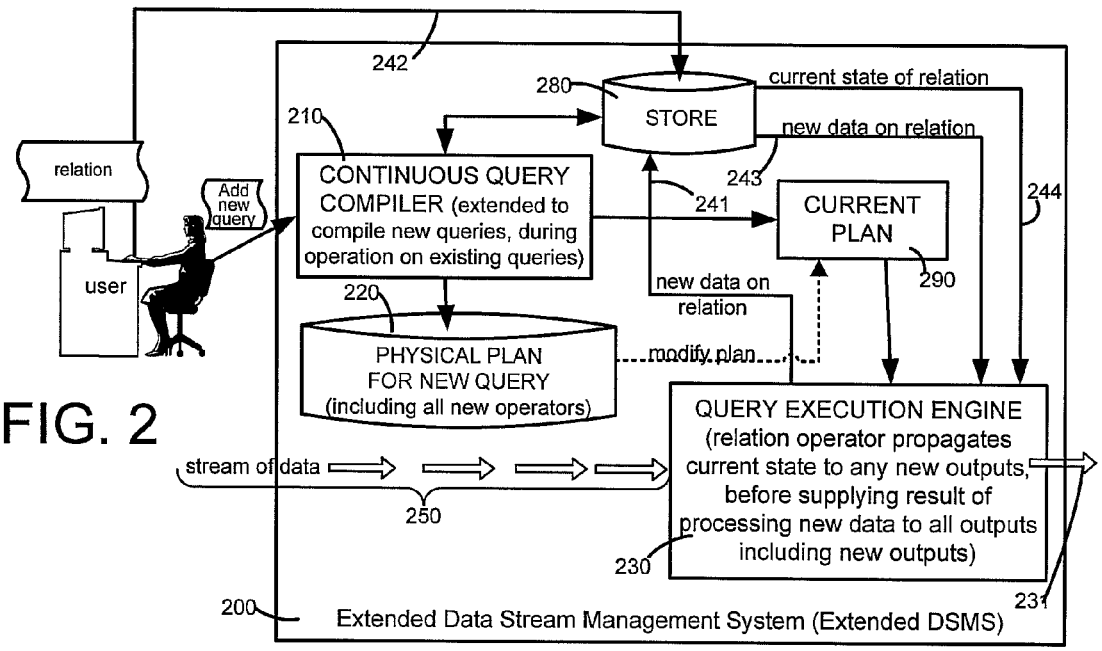
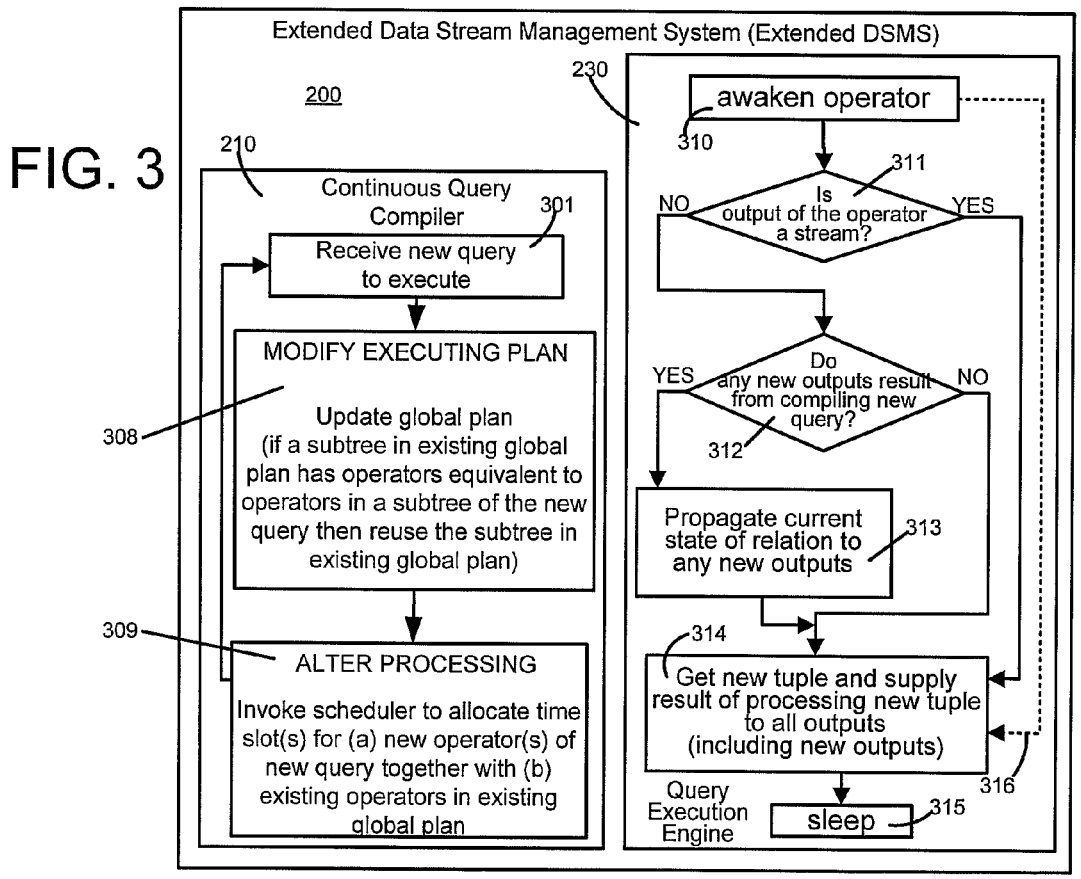

DYNAMICALLY SHARING A SUBTREE OF OPERATORS IN A DATA STREAM MANAGEMENT SYSTEM OPERATING ON EXISTING QUERIES

CROSS-REFERENCE TO RELATED APPLICATIONS

This application is related to and incorporates by reference herein in its entirety, a commonly-owned U.S. application Ser. No. 11/874,202 entitled "ADDING NEW CONTINUOUS QUERIES TO A DATA STREAM MANAGEMENT SYSTEM OPERATING ON EXISTING QUERIES" filed concurrently herewith by the inventors of the current patent application.

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream(s) that matches a query and based on such identified data the engine generates output data, in a streaming fashion.

As noted above, one such system was built at Stanford University, in a project called the Stanford Stream Data Management (STREAM) Project which is documented at the URL obtained by replacing the ? character with "/" and the character with "." in the following: http:??www-db%stanford%edu?stream. For an overview description of such a system, see the article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom which is to appear in a book on data stream management edited by Garofalakis, Gehrke, and Rastogi. The just-described article is available at the URL obtained by making the above described changes to the following string: http:??dbpubs%stanford%edu?pub?2004-20. This article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t increases monotonically. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E which are reproduced from the VLDB Journal paper described in the previous paragraph. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat queries as fixed entities and treat event data as an unbounded collection of data elements. This approach has delivered results as they are computed in near real time. However, in most continuous query systems this prior art approach does not allow continuous queries to be added dynamically. One reason is that a query plan is computed at the time of registration of all queries, before such a prior art DSMS even begins operations on streams of event data.

Once queries have registered and such a prior art DSMS begins to process event data, the query plan cannot be changed, in prior art systems known to the current inventors. The current inventors recognize that adding queries can be done, for example by quiescing Stanford University's DSMS, adding the required queries and starting up the system again. However, the current inventors note that it gives rise to indeterminate scenarios e.g. if a DSMS is being quiesced, there is no defined checkpoint for data in a window for incomplete calls or for data of intermediate computation that has already been performed at the time the DSMS is quiesced.

In one prior art DSMS, even after it begins normal operation by executing a continuous query Q1, it is possible for a human (e.g. network operator) to register an "ad-hoc continuous query" Q2, for example to check on congestion in a network, as described in an article by Shivnath Babu and Jennifer Widom entitled "Continuous Queries over Data Streams" published as SIGMOD Record, September 2001. The just-described paper is incorporated by reference herein in its entirety as background. Such a query Q2 may be written to find a fraction of traffic on a backbone link that is coming from a customer network.

In highly-dynamic environments, a data stream management system (DSMS) is likely to see a constantly changing collection of queries and needs to react quickly to query changes without adversely affecting the processing of incoming time-stamped tuples (e.g. streams). A solution to this problem is proposed in a PhD thesis entitled "Query Processing for Large-Scale XML Message Brokering" by Yanlei Diao published in Fall 2005 by University of California Berkeley, which thesis is hereby incorporated by reference herein in its entirety as background.

The just-described thesis describes a system called YFilter implemented as a Nondeterministic Finite Automaton (NFA) which allows incremental maintenance of a DSMS upon query updates. Yanlei states that it is important to note that because of NFA construction, his system uses an incremental process in which new queries can easily be added to an existing DSMS, and that this ease of maintenance is a key benefit of the NFA-based approach.

Another article entitled "Query Processing for High-Volume XML Message Brokering" by Yanlei Diao et al. describe a path matching engine, as an alternative to extending a tree pattern matching approach to support shared processing. This article cites to a system called MatchMaker described by L. V. S. Lakshmanan, P. Sailaja in an article entitled "On efficient matching of streaming XML documents and queries" published in EDBT on March 2002. Yanlei Diao et al.'s article also cites to an article by C. Chan, P. Felber, et al. entitled "Efficient filtering of XML documents with XPath expressions" published in ICDE in Feb. 2002. The reader is requested to review both these articles, each of which is incorporated by reference herein in its entirety, as background.

Another prior art system is described in a paper entitled "ARGUS: Efficient Scalable Continuous Query Optimization for Large-Volume Data Streams" by Chun Jin and Jaime Carbonell, published at 10th International Database Engineering and Applications Symposium (IDEAS'06), pp. 256-262, which is hereby incorporated by reference herein in its entirety as background. ARGUS is a stream processing system that supports incremental operator evaluations and incremental multi-query plan optimization as new queries arrive. The latter is done to a degree well beyond the previous state-of-the-art via a suite of techniques such as query-algebra canonicalization, indexing, and searching, and topological query network optimization.

ARGUS is comprised of two components, a Query Network Generator and an Execution Engine. Upon receiving a request to register a new continuous query Q, the Query Network Generator parses Q, searches and chooses the sharable computations between Q and the existing query network, constructs a shared optimal query evaluation plan, expands the query network to instantiate the plan, records the network changes in the system catalog, and sends the updated execution code of the query network to the engine. The Execution Engine then runs the execution code, and produces new results if newly arrived stream tuples match the queries. Note that ARGUS requires a database management system at the back end to execute queries.

An article published in the Journal of Universal Computer Science, vol. 12, no. 9 (2006), 1165-1176, on Sep. 28, 2006 entitled "Extension of CQL over Dynamic Databases" by Antal Buza is incorporated by reference herein its entirety as background. This article describes extension of a CQL to support a query that is explicitly made sensitive to an update of a relation. More specifically, according to this article, a new keyword RETROACTIVE indicates that the continuous query is to be virtually re-started when a relation is updated (The 'virtual re-start' means that the system re-reads all relations and one processes the stream from now). In practice, when there is sufficient memory for the storage of the relation, then the query does not read this relation continuously or repeatedly, but does it immediately after the last update of the relation.

SUMMARY

A computer is programmed in accordance with the invention to implement a data stream management system (DSMS) that receives a new continuous query (also called simply "new query") during execution, based on a global plan, of one or more continuous queries that have been previously registered (also called "existing queries"). To reduce the processing required to execute the new query, the DSMS may share a subtree of operators between the global plan and a plan (hereinafter "additional plan") for execution of the new query, if the operators in the two plans are equivalent to one another. Two operators that perform identical functions with identical inputs are treated as equivalent.

In several embodiments of the invention, a computer is programmed to automatically prepare an additional plan for execution of the new query independent of the global plan, followed by traversing the additional plan in a bottom up manner. Specifically, during such traversal, the computer selects a current node and then checks if an operator at the current node is equivalent to any operator in the global plan. If an equivalent operator is found, then the computer makes note of it for future use in modifying the global plan (to execute the new query). If no equivalent operator can be found, the computer modifies the global plan by adding thereto the operator at the current node, thereby to obtain a modified plan.

Then the computer returns to traversing, while using the modified plan as the global plan, unless the current node is a root of the additional plan in which case traversing is complete. A modified plan which results on completion of traversing may include for use in executing the new query, new operators and/or sharing of a subtree of operators that are currently being used in execution of existing queries. After the modified plan is created and prior to execution of the new continuous query, the computer is programmed to propagate to each operator that operates on a relation, a current state of the relation, if the operator is shared but added one or more new outputs.

Thereafter, processing of input data streams which is based on the global plan is altered, to use the modified plan. Specifically, any operators that were not previously scheduled for execution (i.e. newly coupled operators) are also scheduled for execution, which in turn effectively causes the modified plan to be executed. In some embodiments, any operators that were previously scheduled continue to execute as per schedule, independent of addition of the new query. Depending on the embodiment, execution of existing queries is performed without any interruption (or with minimal interruption) from coupling and scheduling of execution of new operators required to execute the new query.

BRIEF DESCRIPTION OF THE DRAWINGS

FIG. 2 illustrates, in an intermediate level diagram, a data stream management system (DSMS) that has been extended in accordance with the invention to support adding new continuous queries during operation on existing continuous queries.

FIG. 3 illustrates, in a flow chart, methods that are executed by the extended DSMS of FIG. 2, in some embodiments of the invention to obtain a modified plan by addition of new continuous queries, and propagation of all tuples of relation operator(s) shared with the new continuous queries during execution of the modified plan.

DETAILED DESCRIPTION

Figure 1A:
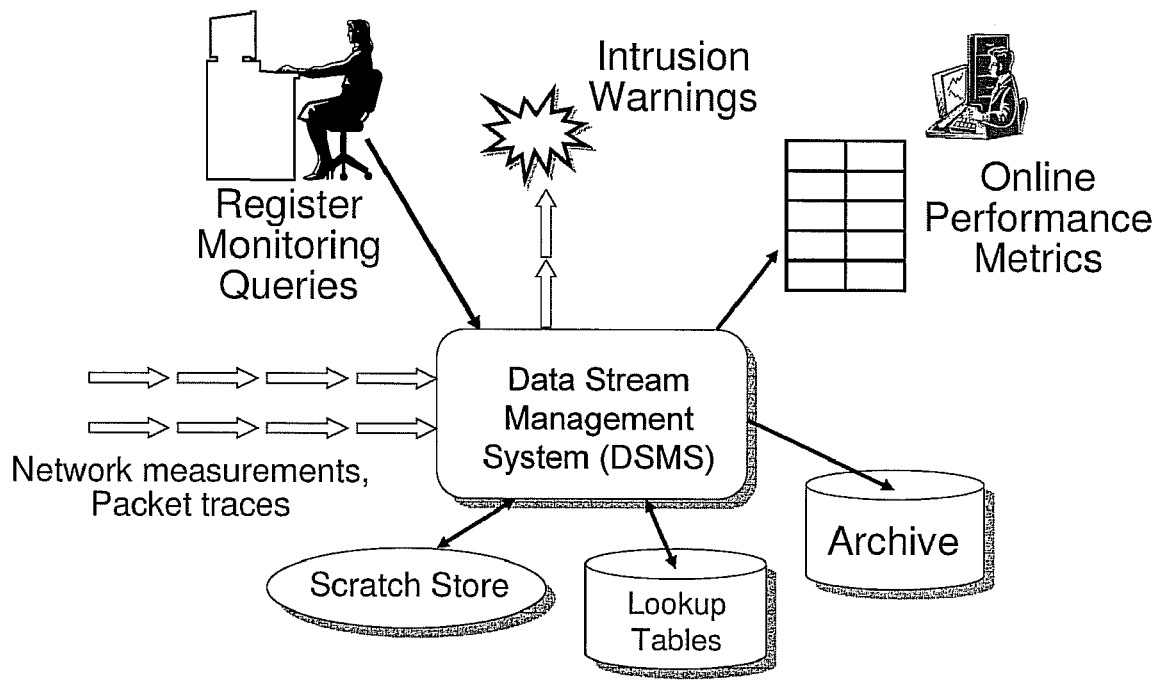
FIGS. 1A and 1B illustrate, in a high level diagram and an intermediate level diagram respectively, a data stream management system of the prior art.
Figure 1B:
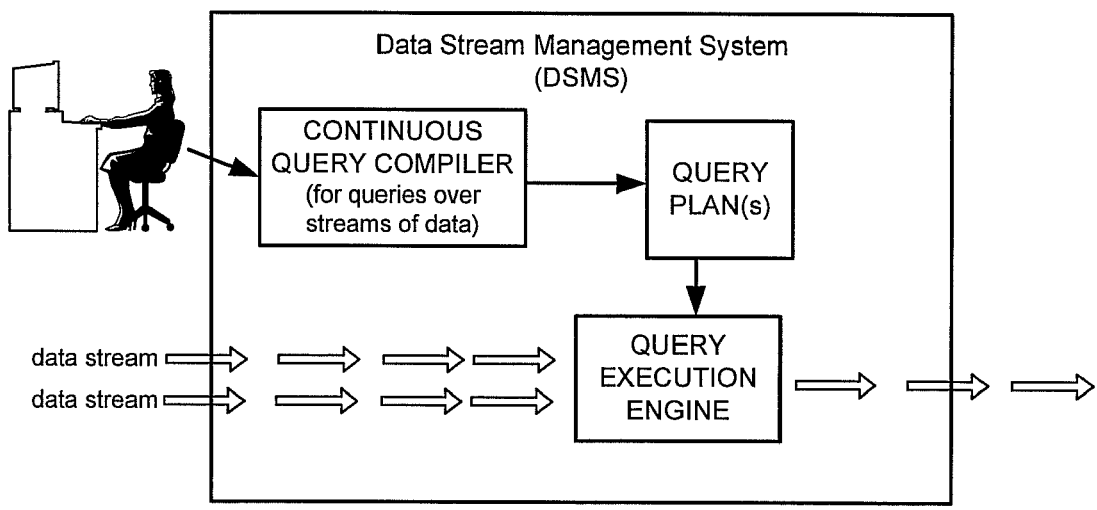
Figures 1C, 1D, 1E:
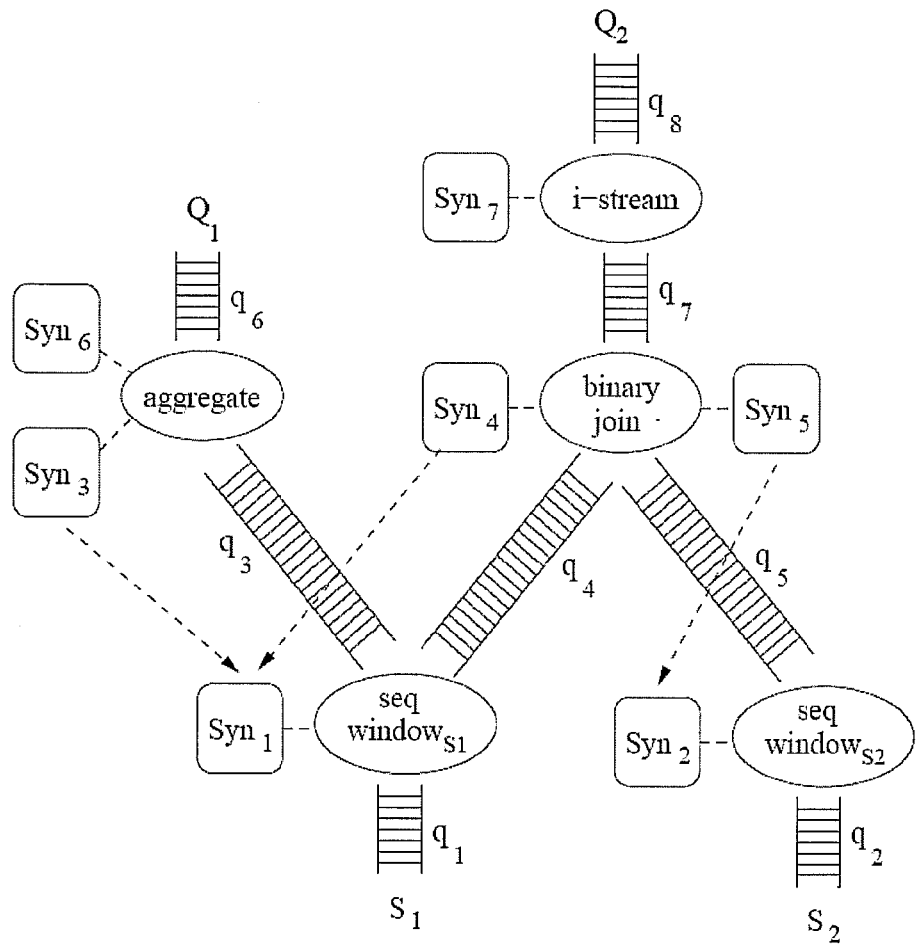
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream.

A DSMS which includes a computer programmed as described in published literature about the Stanford Stream Data Management (STREAM) Project is extended by programming it with certain software in several embodiments of the invention called a continuous query compiler, as discussed below. A continuous query compiler is implemented in accordance with the invention to receive and act on a new continuous query q in an ad-hoc manner, e.g. on the fly during normal operation of the DSMS on existing queries. Accordingly, such a DSMS in accordance with the invention is hereinafter referred to as an extended DSMS.

After receipt, new continuous query q is automatically compiled by continuous query compiler 210 (FIG. 2) performing several acts that are normally performed to implement query compilation, and after compilation the new continuous query q is automatically executed. Query receipt, compilation and execution are performed by some embodiments of extended DSMS 200 (FIG. 2) while processing incoming streams of data 250 by executing thereon one or more continuous queries that were already being executed ("existing queries") prior to receipt of the new continuous query q.

For example, simultaneous with generation of output data stream 231 by execution of existing queries, continuous query compiler 210 parses new continuous query q to build an abstract syntax tree (AST), followed by building a tree of operators. Such a tree of operators typically includes, one or more operators (also called "source operators") that act as source(s) of tuples based on incoming data stream(s) 250 (FIG. 2), and/or source(s) of a stream of information on a relation received via link 243.

In addition to source operators (which are typically but not necessarily located at leaf nodes), the tree of operators includes one or more operators at intermediate nodes (called "query processing operators") that receive data streams from the source operators, and a single root node which includes an output operator to output the results of processing the query. The tree of operators is typically included in a logical plan which does not reference any physical structures. In creating the logical plan, any semantic errors are flagged (e.g. any type mismatches and/or references to non-existent sources of data streams). The nodes of a tree in the logical plan are typically logical operators that are supported by the continuous query language (CQL), such as SELECT and JOIN.

These embodiments then create for that same new query q, a new physical plan p which is independent of a global plan pre-existing in memory 290 that is currently being executed (also called "executing plan") by query execution engine 230 on incoming stream(s) 250. Hence, various physical operators and related resources, such as memory for a queue, needed to execute the new query q are created directly in the new physical plan p, without reference to the global plan. Physical operators accept data of streams and/or relations as input and generate as output data of streams and/or relations. At this stage, physical plan p may be optimized in any manner, depending on the embodiment. To re-iterate, in this process, no check is made as to whether the new continuous query q uses an operator equivalent to or already existing in the global plan.

A global plan which is currently being used by DSMS 200 contains physical resources of all operators for all queries currently being executed. If a new query is received in act 301, then as per act 308 in FIG. 3, to support execution of the new query, continuous query compiler 210 checks if a subtree in the global plan has operators equivalent to operators in a subtree in the new physical plan for new query q. If equivalent, then the global plan is updated, to support execution of the new query q. If a given operator in the physical plan p is not equivalent to any operator in the global plan, then the given operator from the physical plan is simply added to the global plan.

Then, as per act 309, continuous query compiler 210 alters the processing of incoming data streams 250 by query execution engine 230. After alteration, query execution engine 230 continues its processing of incoming data streams 250, now by executing thereon not only the existing queries but also the new query. Some embodiments implement act 309 by invoking a scheduler to allocate time slot(s) for both the operators of the existing query plan (before the new query got added) any new operator(s) of the new query that are referenced in the modified plan that results from modification in act 308. Execution of the modified plan eventually results in execution of the new continuous query at an appropriate time (depending on when its operators are scheduled for execution), in addition to execution of existing queries.

An operator which outputs a relation is also referred to herein as a 'relation operator'. In some embodiments, any output(s) that is/are newly added to a relation operator is/are identified in the modified plan as such (e.g. flagged as requiring initialization), to support propagation thereto of the relation's current state, either before or at least when the relation operator is next awakened. After state propagation, the relation operator continues to process an incoming stream of data about a relation. Specifically, the processing continues wherever the relation operator had left off, when a prior time slot ended. As noted above, a scheduler allocates time slots in which the relation operator executes. On being awakened, the relation operator of some embodiments first propagates any new information on the relation that is received by the relation operator. Results of processing the new information is/are thereafter made available for reading at all outputs of the relation operator (including the newly added output).

Act 301 and portions of 308 (e.g. query parsing and logical tree construction) may be performed by continuous query compiler 210 of extended DSMS 200 in a manner similar or identical to a normal DSMS, unless described otherwise herein. Extended DSMS 200 accounts for the fact that new continuous queries can be added at any time during operation of extended DSMS 200 (e.g. while executing previously registered continuous queries), by any operator A checking (e.g. on being awakened in act 310) if the output of the operator A is a stream (as per act 311 in FIG. 3). If not a stream, the operator A further checks whether any new outputs resulting from compiling the new query Q1 (received in act 301) have been added for each relation (as per act 312 in FIG. 3) and if so propagating that relation's current state (obtained via line 244 in FIG. 2) to the new outputs (as per act 313 in FIG. 3). In the embodiment illustrated in FIG. 3, if the result in act 311 is yes (i.e. the operator's output is a stream), then control transfers directly to act 314.

Note that other embodiments of DSMS 200 may implement the propagation of a relation's state prior to altering the processing by engine 230, i.e. independent of each operator's awakening and execution. Also, awakening of operators in an executing plan and propagation of a relation's state can be performed in any order relative to one another depending on the embodiment. For example, although act 310 (to awaken an operator A which is shared) is shown as being performed before act 313 in FIG. 3, other embodiments perform act 313 before performing act 310. Operator awakening in some embodiments is performed by a scheduler that is programmed to automatically determine (e.g. in a round robin fashion) an order of execution of each operator relative to other operators. The scheduler's list of operators is updated with any new operators that may be required for new queries during registration. Depending on the embodiment, the scheduler may either preallocate time slots to all operators, or alternatively allocate time slots to each operator individually in a dynamic just-in-time manner.

Accordingly, during registration of each new continuous query, the scheduler allocates a time slice for execution of each new operator therein. In several embodiments, the scheduler operates without interrupting one or more operators that are being executed in a current time slice. Hence, in some embodiments, the processing of existing queries is altered to permit processing of the new query thereby to effect a switchover from a currently executing plan to a modified executing plan. In an illustrative embodiment, altering of normal processing is performed at the end of a current time slice, with no delay (i.e. not noticeable in output stream 231 in FIG. 2) in execution of existing queries.

After registration of a new continuous query as described above, extended DSMS 200 of some embodiments continues to perform processing of input data streams 250 in the normal manner but now using the new query in addition to existing queries, i.e. based on the modified plan. Hence, output data streams 231 that were being generated by execution of existing queries continue to be generated without interruption, but are supplemented within DSMS 200 after the altering of processing, by one or more data streams from an output operator of the new continuous query, i.e. by execution of the new continuous query. Hence, DSMS 200 of an illustrative embodiment outputs a stream generated based at least partially on processing of data by execution of the new continuous query.

Depending on the embodiment, an unmodified plan (i.e. a global plan prior to modification) may be originally created, prior to receipt of the new continuous query, by merging of several physical plans for corresponding queries that are currently being executed. The specific methods being used in merging can be different, depending on the embodiment. In some embodiments, a new physical plan is merged into an unmodified plan by sharing just event source operators therebetween, as discussed below in reference to FIGS. 5A-5C. Several other embodiments support on-the-fly addition of a new query while existing queries continue to execute, as described in for example, U.S. patent application Ser. No. 11/874,202 which is incorporated by reference, as noted at the beginning of the current patent application.

Information about a relation that is supplied by link 244 is typically held in a store 280 in extended DSMS 200. Store 280 is typically multi-ported in order to enable multiple readers to access information stored therein. Store 280 may be used to store a relation R's information such as a current state R(t). In certain embodiments relation R is represented in an incremental manner, by tuples that are time stamped, and represent requests for incremental changes to the relation's initial state R(0). An example of a relation that may be represented in this manner is the number of chairs in a conference room. However, other embodiments do not use tuples, and instead maintain in memory an image of the relation's current state R(t), and this image is changed dynamically as relation R changes over time. An example of a relation that may be represented by an image is a Range Window operator on a stream, e.g. if window depth is 10, then such an image holds just 10 tuples.

In embodiments that use tuples to represent a relation, tuples are typically received in extended DSMS 200 in the form of a data stream, e.g. carried by a communication link 242 from a user as shown in FIG. 2. Depending on the embodiment, the tuples of a relation may represent requests for two types of changes, namely requests to insert information or requests to delete previously inserted information, which may respectively constitute an (stream or Dstream as described in the paper by A. Arasu, S. Babu, and J. Widom entitled "The CQL Continuous Query Language: Semantic Foundation and Query Execution" that has been incorporated by reference above.

The just-described stream representation of a relation in some embodiments, by time stamped tuples, is also referred to herein as an incremental representation. Although the incremental representation of a relation uses streams (i.e. Istream and Dstream), note that the relation's state is relatively static (e.g. relative to data stream 250). Hence, in practice, streams Istream and Dstream for a relation are several orders of magnitude smaller (in the rate of information flowing therein) than streams normally processed by extended DSMS 200. Use of Istream and Dstream to represent such a static relation enables several embodiments to process all information in extended DSMS 200 using a single data type, namely the stream data type. In contrast, as noted above, certain alternative embodiments of the invention store a relation's current state information in a non-incremental representation and hence use both data types.

In some embodiments, a relation is represented incrementally in the global plan, as a plurality of tuples with each tuple being time stamped, and all tuples of the relation having a time stamp older than a current time represent the current state.

Embodiments that use an incremental representation of a relation may implement the act of propagating the relation's state by reading the relation's initial state and all subsequent tuples from relational store 280 as illustrated in act 313 of FIG. 3. Some embodiments use a queue to communicate references to tuple references (e.g. pointers to tuples) between a relational operator and any operators coupled thereto (as the queue supports multiple readers). In such embodiments, each of the multiple outputs of the queue initially supplies a current state of a relation R from store 280, for propagation to the respectively coupled readers.

Moreover, each of the multiple outputs of the queue identifies any tuple references in the queue that have not yet been read by its respectively coupled reader. A tuple reference remains in the queue until readers coupled to all outputs of the queue have read the tuple reference, at which time the tuple reference is deleted from the queue. The tuple references are typically arranged in order of receipt relative to one another. A newly added output of the queue may identify to its newly-added reader one or more tuple references that have been already read by other readers coupled to other outputs of the queue. The just-described already-read tuple references may be added to the queue during propagation of current state of a relation, e.g. to initialize the newly added output.

Furthermore, in these embodiments, store 280 has a mechanism (e.g. a bit map) that is unique to relations (i.e. not available to streams), which mechanism allows retention in store 280 of past tuples, for propagation of the past tuples to newly coupled operators. Accordingly, execution of a new continuous query in such embodiments begins with each relation's initial state and past tuples. In these embodiments, execution of the new continuous query on streams (in contrast to relations) does not use any past tuples and instead uses new tuples that are time stamped after the current time (at which time execution resumes).

In some embodiments, a multi-reader queue of the type described above enables propagation (by reading) of a relation's state selectively to only certain operators that are being used in a new continuous query which did not previously read this information. Such selectivity avoids propagation of past tuples multiple times, to operators of existing queries. More specifically, the queue of certain embodiments supports marking by each operator of tuples in a relational store as being available to be read only by individually identified outputs of the queue that have been newly added, for execution of the new continuous query.

The above-described queue may be implemented in any manner well known in the art, although certain embodiments of the invention use the following implementation. The queue does not itself contain any tuples and instead it contains references to a store (which may be a relational store or a window store) in which the tuples are stored. Each output (and hence reader) of the queue has a read pointer which is advanced when a tuple for that output is read from the store. The queue initially holds references to all tuples that are received, until a tuple is read by all readers of the queue, at which time that tuple's reference is automatically deleted from the queue. For example, if a $1^{st}$ continuous query is received at time 100 and a $2^{nd}$ continuous query is received at time 300, and if a tuple of a stream used by both queries came in at time 175 and its negative came in at time 275, then the $2^{nd}$ query never sees this tuple, although references to the tuple and its negative are both seen by the $1^{st}$ query. A negative of a tuple typically represents a request to delete information inserted by the tuple, as discussed above in the paper by by A. Arasu et al. referenced above.

Depending on the embodiment, even when a tuple's reference is deleted from a queue, that particular tuple itself may still exist in the underlying store, for example for use by another queue. The store is implemented in such embodiments with the semantics of a bag of tuples that are written by the queue. These tuples are read by multiple readers of a queue that have been added as subscribers to the store, and each reader may individually dequeue a given tuple's reference, from that reader's view of the queue, after reading the given tuple from the queue. In such embodiments, the queue has only one writer, to write each tuple just once into the store, on receipt of the tuple by extended DSMS 200 from an outside stream (e.g. from a user).

In several embodiments, a store is created in the global plan for and owned by a physical operator (such as a filter) that is used in a continuous query (hereinafter "$1^{st}$ continuous query"). Hence, when a subtree in the global plan which contains the physical operator is shared, to support execution of a $2^{nd}$ continuous query which is added subsequent to start of execution of the $1^{st}$ continuous query, then the underlying store is also shared.

Depending on the embodiment, a physical operator in the global plan may read data from a relation's store or from a store of a window on a stream, using a queue which may be same as or different from the queue used by the same physical operator in the $2^{nd}$ continuous query. A single physical operator that is used in execution of different queries may itself use a single queue to support multiple readers in the different queues of some embodiments, although in other embodiments different queues are used by the same physical operator in different queries.

For example, assume that a store (hereinafter "window store") for a stream operator of an illustrative embodiment holds stream tuples A, B, C and D (also called messages A, B, C and D). If tuple A has been read by the $1^{st}$ continuous query from the window store, then tuple A is dequeued from the $1^{st}$ queue but the same tuple A remains in the window store until a later point in time when tuple A is dequeued by the $2^{nd}$ queue. In this embodiment, tuple A is not deleted from the window store until tuple A has been read by all subscribers that read from the window store, at which time it is automatically deleted.

In the just-described example, after tuple A has been deleted from the window store, if a $3^{rd}$ queue has a new reader that now subscribes to the window store, then the $3^{rd}$ queue may once again insert the same tuple A into the window store, but at this stage the re-inserted tuple A is not available to the $1^{st}$ queue and to the $2^{nd}$ queue (both of which have already read tuple A). This is because messages being inserted for the $3^{rd}$ queue are directed only to its reader (i.e. $3^{rd}$ queue's reader), and not to the readers of the $1^{st}$ queue and the $2^{nd}$ queue.

Propagation to new outputs (see act 313 in FIG. 3) of a relation's current state is performed in some embodiments in a transparent manner, i.e. without any failure that requires a user's attention, whereby soft errors and/or soft exceptions are automatically handled without requiring intervention by the user. Examples of soft errors include lack of a resource, such as memory. For example, a transparency feature may be implemented in some embodiments by architecting propagation of a relation's state to be responsive to soft errors (e.g. lack of memory), by automatically suspending the propagation until the soft error is resolved, followed by automatically resuming the propagation after the soft error is resolved. The transparency feature which is used in some embodiments ensures that the user is not notified of a failure to propagate, because user is not involved in starting such propagation.

Some embodiments of the invention check if operators at multiple levels can be shared. Specifically several embodiments check if operators at level L>0, e.g. a Join operator that is being used for executing existing queries can be shared with a new continuous query. As noted above, such embodiments check if a subtree rooted at p can be implemented by a subtree in the currently executing plan. In alternative embodiments, only bottom-most operators in an execution tree are shared among queries, after checking that the operators have the same name, e.g. if the operators represent the same relation.

During the propagation of entire state of a relation in act 313, all tuples with a current time stamp are propagated, including both insert requests and delete requests, in embodiments that use these form of tuples as described above. Hence, it will be apparent to the skilled artisan, from this disclosure that the extended DSMS 200 thereafter behaves as if the new continuous queries were always present (relative to the relation). Such behavior enables the extended DSMS 200 to execute the new continuous query in a manner consistent with its execution of one or more existing continuous queries. Hence, if a new continuous query happens to be identical to an existing continuous query, identical streams are thereafter produced, as outputs thereof.

Next, a new tuple of the relation is propagated (as per act 314), to all outputs of the corresponding operator (i.e. to new outputs as well as pre-existing outputs of the relation operator). The new tuple of a relation may be generated in any manner, depending on the embodiment. For example, the new tuple may arise from changes to a relation that are identified by a user, via a communication link 242 into store 280 of extended DSMS 200 (FIG. 2). Alternatively, the new tuple may also be generated within the extended DSMS 200 itself, e.g. by a window operator in query execution engine 230 from a stream, which new tuple is stored via line 241 (FIG. 2) in store 280. Note that act 313 (FIG. 3) is not required in case of execution of a stream operator by query execution engine 230, which transfers control via branch 316 directly to act 314. Act 314, as noted above, propagates the new tuple to all outputs of the operator (in this case, the stream operator).

Depending on the embodiment, the extended DSMS 200 may perform act 313 at any time before act 314, after execution resumes with the modified executing plan. In some embodiments, act 313 is performed at whatever time the relation operator that is being shared (between one or more existing queries and one or more new continuous queries) is scheduled to be executed next. In several embodiments, extended DSMS 200 schedules operators on a round-robin basis, although other scheduling mechanisms may also be used in accordance with the invention, depending on the embodiment.

In certain alternative embodiments, act 313 (FIG. 3) may be performed even before the scheduled awakening of, and execution of the shared relation operator, depending on the architecture (e.g. if a relation operator is architected to propagate only incremental changes to state and does not contain functionality to propagate the entire state of the relation). As noted elsewhere herein, in some embodiments the relation does not have an incremental representation at all and instead a complete value of the relation is propagated every time, in which case propagation by act 313 is not performed.

Note that although a procedure for propagating previously-received information to an operator's newly added outputs has been described above in the context of sourcing tuples of a relation, the same procedure may also be used in some embodiments by an operator that sources tuples of a view relation operator (i.e. an operator that sources the information to implement a view on top of a relation). In this context, a view of extended DSMS 200 has the same semantics as a view in a prior art database management system (DMS).

Figure 4A:
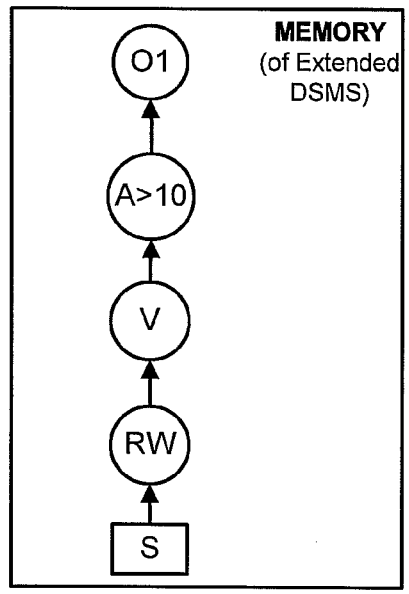
FIGS. 4A-4F illustrate examples of trees of operators at different instants of time during modification of an execution plan to add a new continuous query, in accordance with the invention.

Operation of extended DSMS 200 of some embodiments is further described now, in the context of an illustrative example shown in FIGS. 4A-4E. Specifically, FIG. 4A shows a tree for a query Q1 that is registered for execution in the extended DSMS 200, e.g. by the user typing in the following text in a command line interpreter:

Q1: Select*from V where A>10

Assume that view V is defined on a range window S[rows 10], which identifies the most recent 10 tuples in stream S, relative to current time.

On receiving the above-described continuous query, extended DSMS 200 creates a query object, and stores the root of an optimized physical plan for the query. Note that the root of this plan is not the output operator O1, and instead the root is the operator A>10 (FIG. 4B). Next, extended DSMS 200 starts execution of this plan to generate a stream of output tuples, with the first tuple being O1(100) and at time 500 a current tuple being O1(500). The state of DSMS 200 at time 500 is depicted in FIG. 4B.

At time 500.5, assume a new query Q2 is registered for execution in the extended DSMS 200, e.g. by the user typing in the following text in a command line interpreter:

Q2: Select*from V where A>20

Figure 4C:
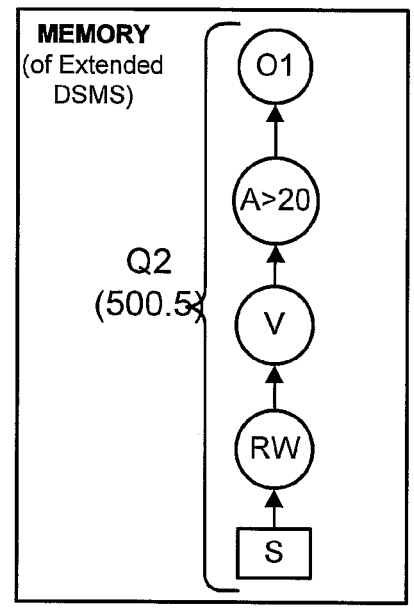
Figure 4B:
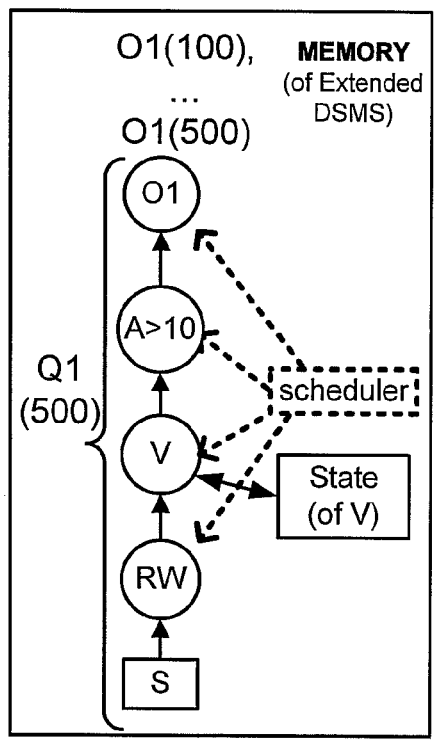

In this example, as seen from FIG. 4C, a tree for query Q2 is almost identical to the corresponding tree for query Q1 shown in FIG. 4A. The only difference between these two queries is the filter, i.e. A>20 is used by Q2 whereas A>10 is used by Q1. Hence, a new physical plan 220 (FIG. 2) for query Q2 is initially generated by the continuous query compiler 210, and a structure of a tree in this new physical plan is illustrated in FIG. 4C.

Figure 4D:
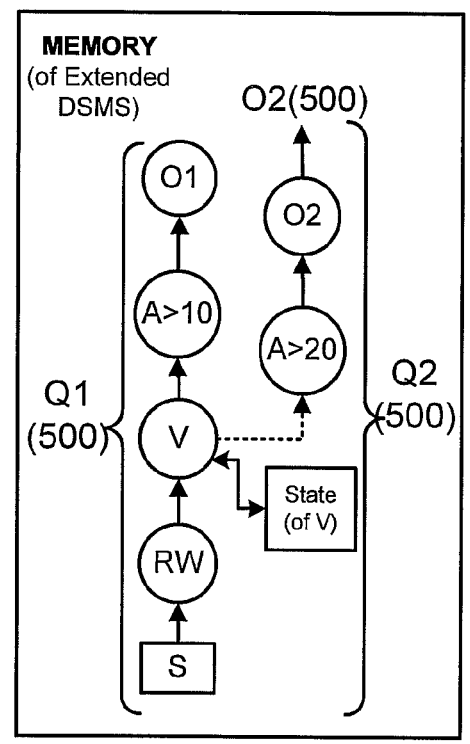
Figure 4E:
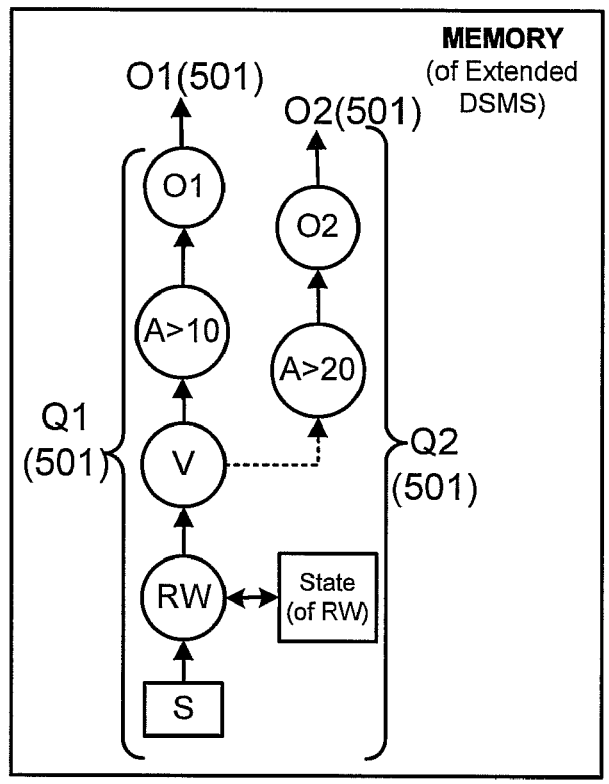

Note that the two physical plans shown in FIGS. 4A and 4C are identical except for the respective filters A>10 and A>20. Accordingly, a subtree consisting of view operator V, range window operator RW and stream operator S can be shared, in a modified plan for execution of both queries Q1 and Q2 as illustrated in FIG. 4D. Hence, as noted above, a continuous query compiler 210 generates the modified plan, by modifying an existing plan in memory 290 (FIG. 2). Note that the following 3 operators are shared in this example: S, RW and V. For operators S and RW, no new outputs were generated as a result of compiling the new query (described in the previous paragraph), and hence no propagation needs to be done.

However, for operator V, a new output A>20 was generated and therefore its current state (i.e. all tuples with the current time stamp) are propagated to filter A>20, as per act 313 (FIG. 3). If the state of view operator V changed at time 500 (before the new query got registered), then the latest value of the relation is propagated to the filter A>20. Subsequently, the view operator V supplies any new tuple at time 501 (see FIG. 4E) to both its outputs and therefore that new tuple is supplied to both filters A>10 and A>20, which in turn generate their corresponding outputs O1(501) and O2(501) for transfer to their respective destinations (not shown in FIG. 4E).

Figure 4F:
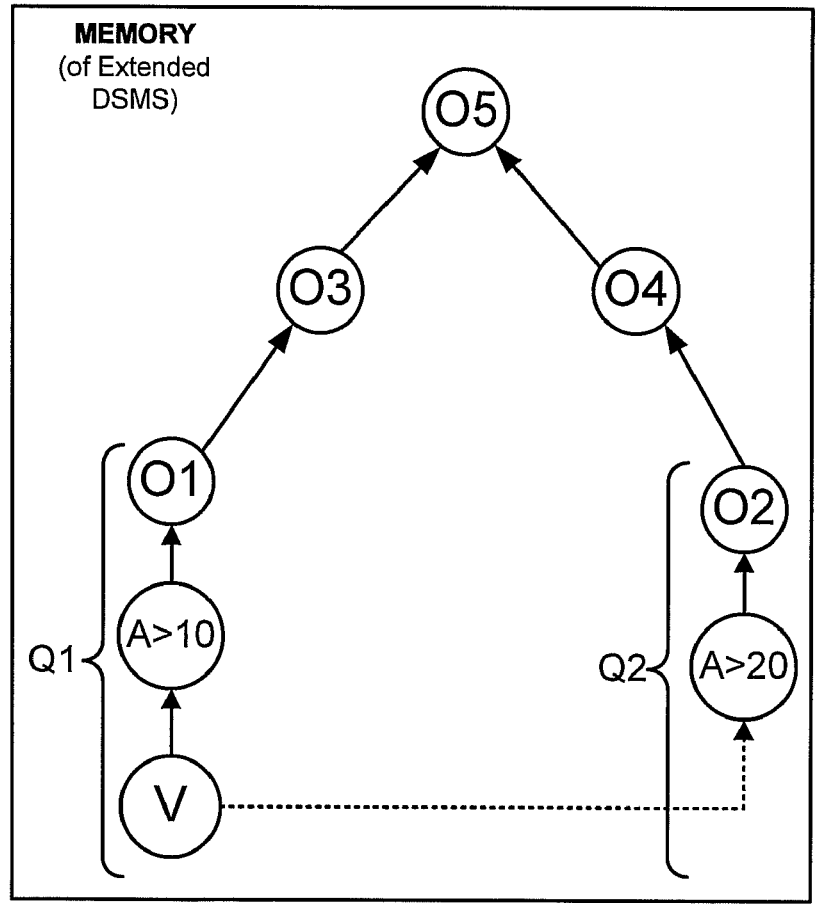

After execution of query Q2 has begun, and after outputs O1(501) and O2(501) have been generated as just described (FIG. 4E), in a similar manner at a future time, a new query Q3 may be submitted to extended DSMS 200, by a user. As shown in FIG. 4F, an example of such a query Q3 may filter the outputs of queries Q1 and Q2 using the respective operators O3 and O4, followed by joining of the filtered results via operator O5. Hence, in this example, the output operators O1 and O2 of queries Q1 and Q2 are modified in some embodiments by adding new queues which from the inputs to new operators O3 and O4, which in turn supply their output streams as input streams to another new operator O5.

In some embodiments, a computer of extended DSMS 200 is programmed to perform the three methods illustrated in FIGS. 5A-5C, to sequentially compute each of a logical plan, a physical plan and to modify an executing plan, as discussed next. Specifically, a query is received in act 301 (FIG. 5A), followed by parsing of the query and performance of semantic analysis in act 301A, followed by building of a syntax tree in act 302A, followed by building of a tree of logical operators in act 302B. Note that the just-described acts can be performed in any manner known in the prior art, e.g. as in any prior art DSMS.

Next, in act 501, level L is set to zero, after which time the computer enters a loop between act 502 (which initializes a current operator Oi to a source operator at level L) and act 507 (which increments the level unless root is reached in which case control transfers to act 508, indicative that the first pass has been completed, and a physical plan for the new query has been computed). In the just-described loop of FIG. 5A, extended DSMS 200 is programmed in several embodiments to traverse the tree of logical operators (built in act 302B), in a bottom-up manner as discussed next although other embodiments of the invention may traverse such a tree in a different order.

After act 502 (FIG. 5A), the computer goes to act 504 and creates a physical operator in a physical plan p for the new query q and connects this physical operator to any existing physical operators in the physical plan p, from which data is to be received. Note that the computer performs act 504 without reference to the global plan, i.e. the computer makes no attempt to share any operators at this stage. Next, in act 506, the computer increments operator Oi to the next operator in current level L and transfer control to act 504, unless there are no more unvisited operators in level L in which case control transfers to act 507 (discussed in the previous paragraph), after which control transfers to act 508. In act 508, the computer performs local optimization on the just-created physical plan, and then goes to act 509. In act 509, the computer saves two identifiers, namely an identifier of the plan's root and an identifier of the query implemented by the plan, and this completes the first pass and the computer goes to a second pass as shown in FIG. 5B.

Figure 5A:
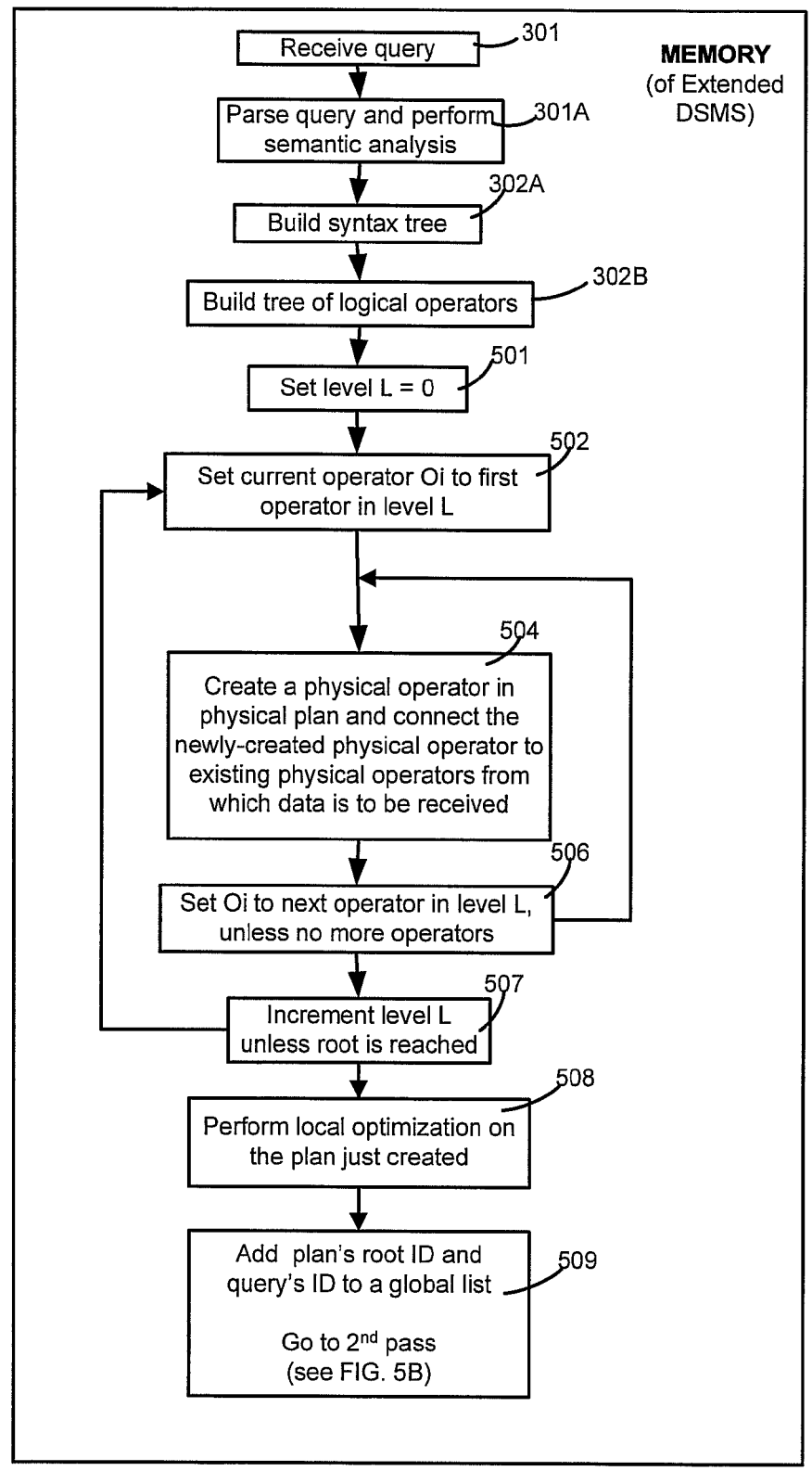
FIGS. 5A-5C together illustrate, in a flow chart, acts of a method that is performed in some embodiments of the invention, to compute a logical plan, a physical plan and modification of a global execution plan, to add a continuous query
Figure 5B:
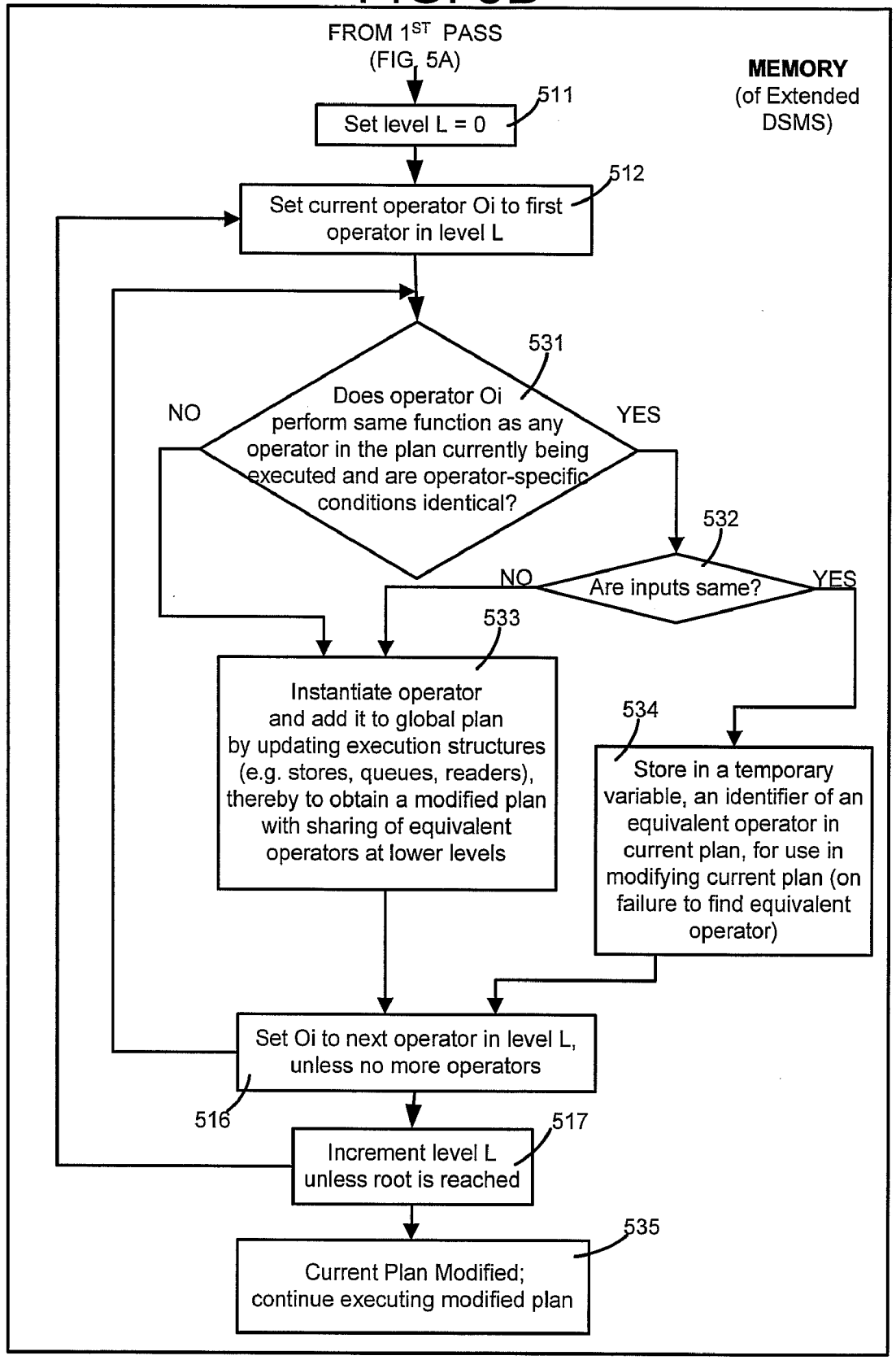

A second pass is begun by the computer as illustrated in FIG. 5B for some embodiments. Specifically, in such embodiments, the computer performs act 511 (FIG. 5B) wherein the level L is set to zero, after which time the computer again enters a loop between act 512 of FIG. 5B (which initializes a current operator Oi to a first operator at level L) and act 517 of FIG. 5B (which increments the level unless root is reached in which case control transfers to act 535 (FIG. 5B), indicative that the second pass has been completed, and the global plan modified).

Referring to FIG. 5B, after act 512 the computer checks (in act 531) if a physical operator in the physical plan corresponding to Oi in the logical plan performs the same function as any operator in the global plan and if so whether the type-specific attributes are identical. If the answer is no, then the computer goes to act 533. In act 533, the computer instantiates an operator corresponding to operator Oi, adds the instantiated operator to the global plan, and updates a subtree in the global plan based on a corresponding subtree in the physical plan associated with the instantiated operator. Addition of the instantiated operator to the global plan, and updating of a subtree in the global plan result in a modified plan that causes execution of operators in the subtree, to be shared between existing queries and the new query. After act 534, the computer proceeds to act 516 (FIG. 5B).

Referring back to act 531, if the answer is yes the computer goes to act 532 to check if the inputs are same, for the physical operator in the physical plan and for the same function operator in the global plan as identified in act 531. If the answer in act 532 is no, then the computer goes to act 533 (described above). If the answer is yes in act 532, then the computer goes to act 534 and stores in a temporary variable, an identifier of the same function operator in the global plan. This stored identifier is used during addition of a new operator to the global plan during performance of act 533 in future, when an equivalent operator cannot be found. After act 534, the computer goes to act 516, discussed next.

In act 516, the computer increments operator Oi to the next operator in current level L and transfers control to act 513, unless there are no more unvisited operators in level L in which case control transfers to act 517 (FIG. 5B), after which the second pass is completed. Note that several acts 511, 512, 516 and 517 in FIG. 5B are similar or identical to corresponding acts 501, 502, 506 and 507 in FIG. 5A.

During operation 531 to check if any operator in the global plan performs the same function as, and has the same type-specific attributes as an operator in the physical plan of a new query, the computer of some embodiments may programmed to perform a number of acts 531A-531E as discussed next, although in other embodiments this operation 531 may be performed by other acts that will be apparent to the skilled artisan in view of this disclosure.

Figure 5C:
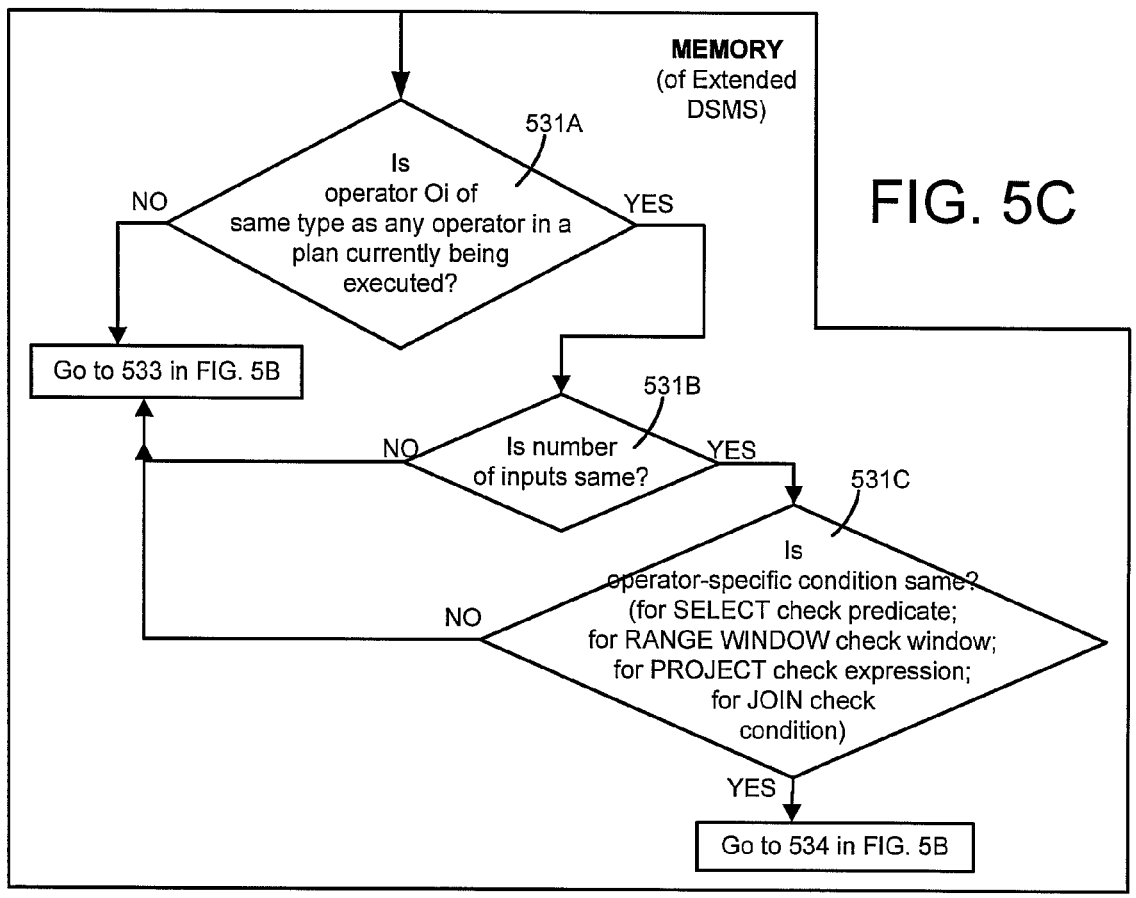

Referring to FIG. 5C, in act 531A, the computer checks if the physical operator (corresponding to logical operator Oi) is of the same type as any operator in the global plan. Note that the function performed by each operator is identified from the operator's type in these embodiments. If the answer is no in act 531A, then control transfers to act 533 (illustrated in FIG.

5B and described above). If the answer is yes in act 531A, then the computer goes to act 531B to check if the number of inputs of the two operators (which were found to be of same type in act 531A) is the same. If the answer is no in act 531B, then again control transfers to act 533 (illustrated in FIG. 5B and described above).

If the answer is yes in act 531B, then the computer goes to act 531C to check if one or more attributes which are specific to the type of each operator (called "type-specific attributes") are the same. One example of a type-specific attribute is the predicate of a SELECT operator. In another example, three type-specific attributes are range, slide and startAt values for a Range Window operator. Similarly, another example of a type-specific attribute is the join condition for a JOIN operator. Finally, yet another example of a type-specific attribute is a project expression of a PROJECT operator.

Accordingly, in act 531C, the computer checks if all type-specific attributes of an operator in the global plan have values that are identical to the corresponding type-specific attributes in the physical plan for the new query q. If the answer is no in act 531C, then control transfers to act 533 (illustrated in FIG. 5B and described above). If the answer is yes in act 531C, then the computer goes to act 532 in FIG. 5B (also described above). In these embodiments, prior to beginning execution of the new query, each operator on being awakened checks if the operator receives relation data and if so, the relation state is propagated prior to transfer of any data as noted above.

Figure 6:
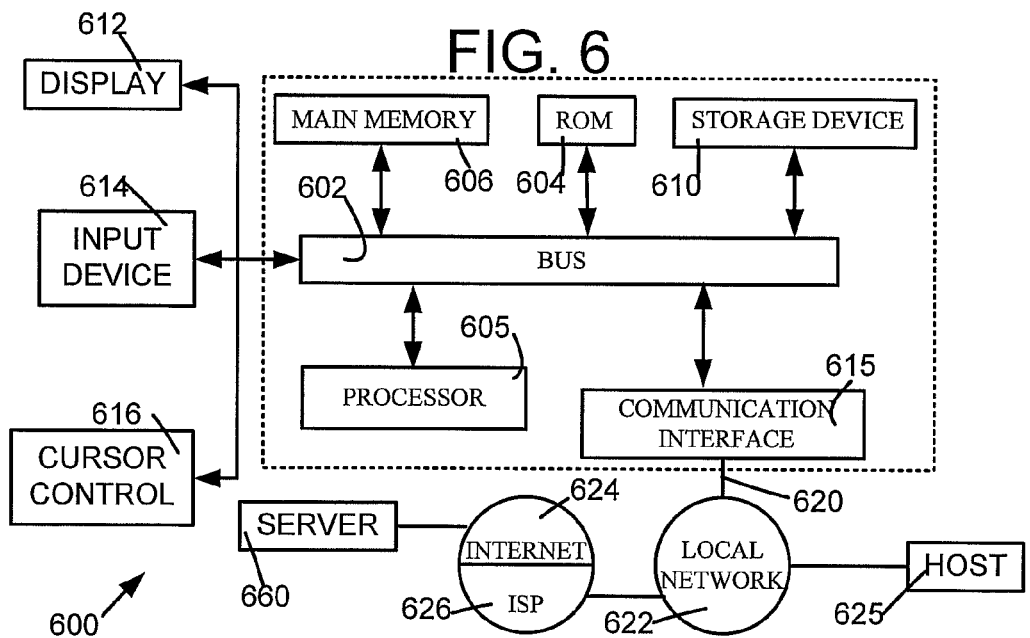
FIG. 6 illustrates, in a high level block diagram, hardware included in a computer that may be used to perform the methods of FIGS. 5A-5C in some embodiments of the invention.

Note that the extended data stream management system 200 may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 605 coupled with bus 602 for processing information.

Computer system 600 also includes a main memory 606, such as a random access memory (RAM) or other dynamic storage device, coupled to bus 602 for storing information and instructions to be executed by processor 605. Main memory 606 also may be used for storing temporary variables or other intermediate information during execution of instructions to be executed by processor 605. Computer system 600 further includes a read only memory (ROM) 604 or other static storage device coupled to bus 602 for storing static information and instructions for processor 605. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 that is being output by computer system 600. An example of data stream 231 is a continuous display of stock quotes, e.g. in a horizontal stripe at the bottom of display 612. An input device 614, including alphanumeric and other keys, is coupled to bus 602 for communicating information and command selections to processor 605. Another type of user input device is cursor control 616, such as a mouse, a trackball, or cursor direction keys for communicating direction information and command selections to processor 605 and for controlling cursor movement on display 612. This input device typically has two degrees of freedom in two axes, a first axis (e.g., x) and a second axis (e.g., y), that allows the device to specify positions in a plane.

As described elsewhere herein, query compilation and execution of compiled code from shared memory are performed by computer system 600 in response to processor 605 executing instructions programmed to perform the above-described acts and contained in main memory 606. Such instructions may be read into main memory 606 from a computer-readable storage medium, such as storage device 610. Execution of instructions contained in main memory 606 causes processor 605 to perform the process steps described herein. In alternative embodiments, hard-wired circuitry may be used in place of or in combination with software instructions to implement an embodiment of the type illustrated in FIGS. 5A-5C. Thus, embodiments of the invention are not limited to any specific combination of hardware circuitry and software.

The term "computer-readable non-transitory storage medium" as used herein refers to any non-transitory storage medium that participates in providing instructions to processor 604 for execution. Such a non-transitory storage medium may take many forms, including but not limited to, non-volatile storage media, and volatile storage media. Non-volatile storage media includes, for example, optical or magnetic disks, such as storage device 610. Volatile storage media includes dynamic memory, such as main memory 606.

Common forms of computer-readable non-transitory storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter, or any other non-transitory storage medium from which a computer can read.

Various forms of computer readable non-transitory storage media may be involved in carrying the above-described instructions to processor 604 to implement an embodiment of the type illustrated in FIGS. 5A-5C. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 605 executes the instructions contained therein. The instructions held in main memory 606 may optionally be stored on storage device 610 either before or after execution by processor 605.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 615. In the Internet example, a server 660 might transmit a code bundle through Internet 624, ISP 626, local network 622 and communication interface 615. In accordance with the invention, one such downloaded set of instructions implements an embodiment of the type illustrated in FIGS. 5A-5C. The received set of instructions may be executed by processor 605 as received, and/or stored in storage device 610, or other non-volatile storage for later execution.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

Numerous modifications and adaptations of the embodiments described herein will be apparent to the skilled artisan in view of this current disclosure. Accordingly numerous such modifications and adaptations are encompassed by the attached claims.

Following Subsections A-C are integral portions of the current patent application and are incorporated by reference herein in their entirety. Subsections A and B describe one illustrative embodiment in accordance with the invention. Subsection C describes pseudo-code that is implemented by the embodiment illustrated in Subsections A and B.

Subsection A (of Detailed Description)

A method performed in some embodiments is illustrated in the following pseudo-code.

---

1. Registering a query Q with the system
   a. This is done as per act 301 in FIG. 5A. An object for the query is created in metadata. In some embodiments, a command interpreter receives the user's text for the query.
   b. At this point, the query text is parsed, semantic analysis is done (and if there are no user errors in the query specification) the logical plan is computed, the physical plan is computed and the physical plan is also optimized.
   c. After completion of semantic analysis, the list of from clause entities are visited to determine if this query has any direct dependencies on views. For each of the views that this query directly depends on, the query associated with the view is obtained and is stored in the Query object as the set of query dependencies; This is done as part of act 301A in FIG. 5A.
   d. A Query object is created and it stores the root of the optimized physical plan for the query. Note that the root of this plan is not the Output operator.
   e. As part of the physical plan computation, sharing of the common (with other queries) base tables and views is also achieved. View sharing involves "pointing" to the view root operator that is "above" the root operator for the query associated with the view. For base table and view, sources that are referenced for the first time by this query (i.e. no other registered query in the system references these base tables/views), a Stream Source operator and a View Root operator are created and stored in a global array of source operators maintained in PlanManager. This is illustrated in act 504.
2. Destinations for the query Q are specified.
   a. A physical layer Output operator is created. This results in the creation of the Output operator and its association with the Input/Output driver corresponding to the specified destination. The instance of the Output operator created is returned. See act 504
   b. The returned Output operator is added to a list of outputs for the query and stored inside the Query object. See act 505
   c. At this point, the query Q is checked if it has already been started
   d. If no (as in this case), then nothing else needs to be done
3. The query Q is started for execution
   a. If the query has already been started, then do nothing and return
   b. Else, recursively, execution operators are created recursively for the operators
   c. The state of the query is set to STARTED, so that it doesn't get started again. Note that this state is checked in 2 (c) above.

Subsection B (of Detailed Description)
A method performed in some embodiments is illustrated in the following pseudo-code.

---

In one implementation, the internal representation of a relation is an incremental representation. When a new query Q is being admitted into an already running system (dynamic query addition), the following scenario may be encountered. There could be a newly created execution operator p (newly created and private to the current query Q) one of whose inputs is an operator c that is being shared and is already part of the running system when query Q is being admitted into the system.

If operator c evaluates to a relation, then the operator c first propagates its current relation state to the newly created operator p (which is coupled to an output of c) (via the queue connecting operators c and p), before sending any further data on the relation. This is because an incremental representation is used for relations and this implies that a starting snapshot (i.e. an initial state) is required on top of which subsequent incremental data have to be applied, to determine the state of a relation at any point in time (the state of the relation input from c, for the operator p).

Thus, to support dynamic query addition, several embodiments identify existing operators that need to propagate their relation's state, and also identify the newly created operators to which they should be propagating that state. Some embodiments identify existing operators that need to propagate their relation's current state, and also identify for each such existing operator the queue reader identities ("ids") corresponding to the newly created operators to which state is to be propagated.

Following describes a general approach used in various embodiments on top of any operator sharing algorithm (OSA for short) which has the following property called "OSA Subgraph Property": If OSA determines that an operator corresponding to p can be shared from the existing global execution plan, then OSA determines that the subtree rooted at p can be implemented by a subgraph of the existing global execution plan.

Introduction
1. Q denotes the current query being started
2. GQ denotes the global execution plan that also implements the query Q. GQ forms a directed acyclic graph.
3. Plan GQ is constructed with sharing being determined using an operator sharing algorithm OSA that satisfies the OSA Subgraph property.
4. For each operator p in GQ there is an array of query ids called qidarray. For each qid in this array, operator p participates in the implementation of the query identified by qid.
5. The above-described array is created and maintained as part of creation of GQ by extending OSA.
6. The approach described below is done during the instantiation phase for the query Q The Method
1. Perform the current instantiation traversal. This is a bottom-up traversal such that when visiting node 'n', all of its inputs have already been visited.
   1. A current node in the traversal is denoted by n (a physical operator).
   2. If n is a node private to query Q (i.e. the qidarray in n, has only one entry —the qid for the query Q) then
      1. Let inps be the array of inputs for the node n
      2. for i=0; i<inps.length; i++
         1. if inps[i] is shared in GQ (qidarray.length > 1) and inps[i] is a relation then
            1. Let the queue reader id corresponding to the source destination pair (inps[i], n) be rid.
            2. Get an execution operator corresponding to inps[i] and invoke inps[i].instOp.propagateOldData(rid).
            3. Implementation Note: For the above, introduce a method void propagateOldData (int rid). Some embodiments have a default implementation in the base class if they can get a reference to a RelStore (note this is an interface and the underlying implementation could be WinStoreImpl, LineageStoreImpl or RelStoreImpl) which gives the state of its output relation.
         2. if inps[i] is private to Q or inps[i] evaluates to a stream, then do nothing;
   3. If n is a shared node in GQ, then do nothing;
2. At the end of this traversal, the requirement would have been addressed

---

Subsection C (of Detailed Description)
A method performed in some embodiments is illustrated in the following pseudo-code.

---

We move from the logical plan for a query Q to the physical plan (this physical plan is actually part of the global plan since identification and sharing of physical operators also happens at this step) through the following algorithm:
1.  Iterate over the logical plan tree bottom-up (children before parent), and create corresponding new physical operators.
2.  Do not identify any sharing opportunities in step 1. Output of this step is L.

-continued

3. Perform local optimizations on L. Output of this step is OL.
4. Identify sharing opportunities for OL in G and merge OL with G to get the new global plan G which includes the physical plan for the current query Q as well.
The rest of this document focuses on step 4 above, namely the algorithm to identify sharing opportunities between OL and G, and the updating of G.
Sharing Algorithm
1. Inputs are OL and G
2. Note that OL is also a (directed) tree of physical operators
3. Traverse OL in bottom-up fashion. So, the invariant is when visiting node 'n', all of its children have already been visited.
  1. Let the current node in the traversal be n.
  2. Find out operator s from G that is "partially equivalent" to the operator n (See later for definition of partial equivalence of two physical operators)
  3. If no such s exists, fixinputs(n) and continue with the loops
  4. If s exists and s.isShareable( ) check the following
    1. Compare corresponding inputs of s and n. This can be implemented by having a transient instance variable in the physical operator called globalEquiv that is non-null if and only if the local operator is completely equivalent to an operator in the global plan. Then this comparison is essentially a "pointer" comparison (via the = = operator)
    2. If all inputs are identical, then s is equivalent to n.
      1. Set n.globalEquiv = s;
      2. ASSERT: Each node in the subtree of OL rooted at n, has a non-null globalEquiv. i.e. the entire subtree rooted at n, has a corresponding subgraph in the global plan
    3. If all inputs are not identical, fixinputs(n) and then continue with the loop
4. Return the root physical operator (part of the updated global plan G) for the query Q
fixinputs(n)
1. Let inps be the array of operators that are the inputs of n
2. inps comes from the OL operator tree
3. for i=0; i<inps.length; i++
  1. x = inps[i].globalEquiv;
  2. Note x is from the global plan
  3. if (x is not null)
    1. set n as output of x
    2. set x as input i of n replacing the input i of n from the OL tree
  4. This introduces n into the global plan and updates the global plan
Partial Equivalence of physical operators
Intuitively, two physical operators, p1 and p2 are considered partially equivalent if they would produce identical output when ever their inputs are identical
So, we might implement this as follows -
1. Check that p1 and p2 are operators of the same type (i.e. both are SELECTS or both are RANGE WINDOWS etc)
2. Check that p1 and p2 have the same number of inputs (in our current implementation this is true operator types are identical. This would become meaningful if we support operators with variable number of inputs such as n-ary joins, where n is variable)
3. The rest is specific to the operator type and can be implemented in an object oriented fashion. For example,
    a) For a SELECT, check that the predicate expression is identical
    b) For a RANGE WINDOW, the window specification (Range, Slide, StartAt) should be identical
    c) For a PROJECT, the project expressions should be identical
    d) For a JOIN, the join condition should be identical
    e) etc . . .

Shareable Operator

The intuition behind this is as follows. If a physical operator (instance) is shareable and if it evaluates to a relation, then this operator should be capable of propagating its relation state.

While the algorithm is static, in the sense that the decision to share or not is not influenced by run time statistics, it can be evolved to include this as well in the future.

An advantage of this solution is it gives the DSMS much better scalability and is independent of the query plan. This does not need to change to incorporate future optimizations in the query plan.

What is claimed is:

1. A computer-implemented method of processing a plurality of input streams of data, the method comprising:
  processing the plurality of input streams in a computer, by executing thereon a plurality of existing continuous queries based on a global plan;
  during said processing, receiving a new continuous query to be executed;
  during said processing, preparing an additional plan for use in execution of the new continuous query independent of the global plan;
  wherein the additional plan is created and optimized independent of the global plan currently used by said processing, the additional plan including physical operators to execute the new continuous query;
  during said processing, traversing the additional plan in a bottom up manner, to select therefrom a current node;
  during said processing, checking if an operator at the current node is equivalent to any operator in a plurality of operators in the global plan currently used by said processing;
  wherein two operators that perform identical functions with identical inputs are determined by said checking to be equivalent;
  if said checking finds no equivalent, modifying the global plan currently used by said processing by adding thereto said operator at the current node to obtain a modified plan during said processing;

if said checking finds equivalence, and if said operator at the current node outputs a relation, propagating from said any operator, a current state of said relation to a new operator in the modified plan for use in executing said new continuous query prior to execution of the new continuous query;

wherein said propagating comprises using as said current state, a plurality of past tuples of said relation having a time stamp older than a current time;

returning to said traversing with the modified plan as the global plan, unless the current node is a root of the additional plan;

altering said processing, to cause execution of the new continuous query in addition to said plurality of existing continuous queries, based on the modified plan;

wherein said execution of the new continuous query on a stream in the plurality of input streams does not use any past tuples and instead uses new tuples that are time stamped after the current time; and outputting from said computer, a stream generated based at least partially on processing of said data by executing the new continuous query.

2. The method of claim 1 further comprising:

storing in computer memory an identifier of said any operator determined to be equivalent, in a temporary variable associated with the operator at the current node, if a result of said checking is true; and using said identifier during said modifying.

3. The method of claim 1 wherein:

said propagating is performed in a manner transparent to a user of said computer, relative to at least one predetermined soft error.

4. The method of claim 1 wherein:

said propagating of said current state of said relation to the new operator is performed at a time when the new operator is awakened subsequent to creation of the modified plan.

5. A non-transitory computer readable storage medium encoded with a plurality of instructions for a computer to process a plurality of input streams of data, the instructions comprising:

instructions to process the plurality of input streams in said computer, by executing thereon a plurality of existing continuous queries based on a global plan;

instructions to be executed during processing of the plurality of input streams, to receive a new continuous query to be executed;

instructions to be executed during processing of the plurality of input streams, to prepare an additional plan for use in execution of the new continuous query independent of the global plan;

wherein the additional plan is created and optimized independent of the global plan currently used by said instructions to process, the additional plan including physical operators to execute the new continuous query;

instructions to be executed during processing of the plurality of input streams, to traverse the additional plan in a bottom up manner, to select therefrom a current node;

instructions to be executed during processing of the plurality of input streams, to check if an operator at the current node is equivalent to any operator in a plurality of operators in the global plan currently used by said processing;

instructions to be executed during processing of the plurality of input streams, wherein two operators that perform identical functions with identical inputs are determined to be equivalent by said instructions to check;

instructions to be executed if execution of the instructions to check finds no equivalent, to modify the global plan currently used by said processing by adding thereto said operator at the current node to obtain a modified plan during said processing;

instructions to be executed if execution of the instructions to check finds equivalence, and if said operator at the current node outputs a relation, to propagate from said any operator, a current state of said relation to a new operator in the modified plan for use in executing said new continuous query prior to execution of the new continuous query;

wherein said instructions to propagate comprise instructions to use a plurality of past tuples of said relation having a time stamp older than a current time;

instructions to return to said instructions to traverse with the modified plan as the global plan, unless the current node is a root of the additional plan;

instructions to alter processing of the plurality of input streams, to cause execution of the new continuous query in addition to said plurality of existing continuous queries, based on the modified plan;

wherein execution of the new continuous query on a stream in the plurality of input streams does not use any past tuples and instead uses new tuples that are time stamped after the current time; and instructions to output from said computer, a stream generated based at least partially on processing of said data by executing the new continuous query.

6. The non-transitory computer readable storage medium of claim 5 further comprising:

instructions to store an identifier of said any operator determined to be equivalent, in a temporary variable associated with the operator at the current node, if a result of said checking is true; and instructions to use said identifier during execution of said instructions to modify.

7. The non-transitory computer readable storage medium of claim 5 wherein:

said instructions to propagate are executed in a manner transparent to a user of said computer, relative to at least one predetermined soft error.

8. The non-transitory computer readable storage medium of claim 5 wherein:

said instructions to propagate are executed at a time when the new operator is awakened subsequent to creation of the modified plan.

9. A computer comprising:

means for processing a plurality of input streams in said computer, by executing thereon a plurality of existing continuous queries based on a global plan;

means, operable during processing of the plurality of input streams, for receiving a new continuous query to be executed;

means, operable during processing of the plurality of input streams, for preparing an additional plan for use in execution of the new continuous query independent of the global plan;

wherein the additional plan is created and optimized independent of the global plan currently used by said means for processing, the additional plan including physical operators to execute the new continuous query;

means, operable during processing of the plurality of input streams, for traversing the additional plan in a bottom up manner, to select therefrom a current node;

means, operable during processing of the plurality of input streams, for checking if an operator at the current node is equivalent to any operator in a plurality of operators in the global plan currently used by said processing;

means, operable during processing of the plurality of input streams, wherein two operators that perform identical functions with identical inputs are determined to be equivalent by said means for checking;

means, operable if the means for checking finds no equivalent, for modifying the global plan currently used by said processing by adding thereto said operator at the current node to obtain a modified plan during said processing;

means, operable if the means for checking finds equivalence, and if said operator at the current node outputs a relation, for propagating from said any operator, a current state of said relation to a new operator in the modified plan for use in executing said new continuous query prior to execution of the new continuous query;

wherein said means for propagating comprise means for using as said current state, a plurality of past tuples of said relation having a time stamp older than a current time;

means for returning control to said means for traversing with the modified plan as the global plan, unless the current node is a root of the additional plan;

means for altering processing of the plurality of input streams, to cause execution of the new continuous query in addition to said plurality of existing continuous queries, based on the modified plan;

wherein execution of the new continuous query on a stream in the plurality of input streams does not use any past tuples and instead uses new tuples that are time stamped after the current time; and means for outputting from said computer, a stream generated based at least partially on processing of said data by executing the new continuous query.

10. The computer of claim 9 further comprising:
means for storing an identifier of said any operator determined to be equivalent, in a temporary variable associated with the operator at the current node, if a result of said checking is true; and
means for using said identifier comprised in said means for modifying.

11. The computer of claim 9 wherein:
said means for propagating operate in a manner transparent to a user of said computer, relative to at least one predetermined soft error.

12. The computer of claim 9 wherein:
said means for propagating operate at a time when the new operator is awakened subsequent to creation of the modified plan.

13. The method of claim 1 wherein:
each tuple in the current state represents an incremental change to an initial state of the relation.

14. The method of claim 13 wherein:
all tuples of the relation at the current time represent said current state.

15. The non-transitory computer readable storage medium of claim 5 wherein:
each tuple in the current state represents an incremental change to an initial state of the relation.

16. The non-transitory computer readable storage medium of claim 5 wherein:
the relation is represented incrementally in the global plan by a plurality of tuples that are time stamped; and
all tuples of the relation at a current time represent said current state.

17. The computer of claim 9 wherein:
the relation is represented incrementally in the global plan by a plurality of tuples that are time stamped; and
all tuples of the relation at a current time represent said current state.

* * * * *

UNITED STATES PATENT AND TRADEMARK OFFICE
CERTIFICATE OF CORRECTION

| | | |
|---|---|---|
| PATENT NO. | : 8,296,316 B2 | Page 1 of 1 |
| APPLICATION NO. | : 11/874197 | |
| DATED | : October 23, 2012 | |
| INVENTOR(S) | : Jain et al. | |

It is certified that error appears in the above-identified patent and that said Letters Patent is hereby corrected as shown below:

On page 3, in column 2, under "Other Publications", line 56, delete "Postdam," and insert -- Potsdam, --, therefor.

In column 1, line 57, after "the" insert -- % --.

In column 5, line 58, after "query" insert -- . --.

In column 10, line 33, delete "by by" and insert -- by --, therefor.

In column 24, line 16, in Claim 6, after "use" insert -- as said current state, --.

Signed and Sealed this
Eighth Day of January, 2013

David J. Kappos
*Director of the United States Patent and Trademark Office*